United States Patent
Lai et al.

(10) Patent No.: US 11,622,208 B2
(45) Date of Patent: Apr. 4, 2023

(54) APPARATUS AND METHOD FOR OWN VOICE SUPPRESSION

(71) Applicant: British Cayman Islands Intelligo Technology Inc., Grand Cayman (KY)

(72) Inventors: Chao-Jung Lai, Zhubei (TW); ChenChu Hsu, Zhubei (TW); ChiHao Chen, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 8 days.

(21) Appl. No.: 17/324,717

(22) Filed: May 19, 2021

(65) Prior Publication Data
US 2022/0078561 A1 Mar. 10, 2022

Related U.S. Application Data

(60) Provisional application No. 63/075,310, filed on Sep. 8, 2020.

(51) Int. Cl.
H04R 25/00 (2006.01)
G10L 21/02 (2013.01)
G10L 17/12 (2013.01)

(52) U.S. Cl.
CPC ............. *H04R 25/50* (2013.01); *G10L 17/12* (2013.01); *G10L 21/02* (2013.01); *H04R 25/604* (2013.01); *H04R 2225/43* (2013.01)

(58) Field of Classification Search
CPC .......... H04R 25/50–507; H04R 25/604; H04R 2225/43; H04R 25/505; H04R 5/033;
(Continued)

(56) References Cited

U.S. PATENT DOCUMENTS 10,499,167 B2  12/2019  Kuriger et al.
2021/0345047 A1*  11/2021  Sabin ................... H04R 25/505
(Continued)

FOREIGN PATENT DOCUMENTS

CN  105916090 A  8/2016
CN  105869651 B  5/2019
(Continued)

OTHER PUBLICATIONS

Upadhyay, Navneet et al., "Single Channel Speech Enhancement: using Wiener Filtering with Recursive Noise estimation," Procedia Computer Science, 84 (2016) 22-30.
(Continued)

*Primary Examiner* — Mark Fischer
(74) *Attorney, Agent, or Firm* — Muncy, Geissler, Olds & Lowe, P.C.

(57) ABSTRACT

An own voice suppression apparatus applicable to a hearing aid is disclosed. The own voice suppression apparatus comprises: an air conduction sensor, an own voice indication module and a suppression module. The air conduction sensor is configured to generate an audio signal. The own voice indication module is configured to generate an indication signal according to at least one of user's mouth vibration information and user's voice feature vector comparison result. The suppression module coupled to the air conduction sensor and the own voice indication module is configured to generate an own-voice-suppressed signal according to the indication signal and the audio signal.

24 Claims, 19 Drawing Sheets

(58) Field of Classification Search
CPC .............. H04R 3/005; H04R 2205/041; H04R 2460/01; H04R 2201/107; H04R 2460/05; H04R 25/405; G10L 17/12; G10L 21/02; G10L 21/0364; G10L 25/84; G10L 21/0208; G10L 2021/02087; G10L 17/18; G10L 17/00–26
See application file for complete search history.

(56) References Cited

U.S. PATENT DOCUMENTS

| 2022/0046365 A1* | 2/2022 | Best | H04R 25/50 |
| 2022/0150627 A1* | 5/2022 | Zhou | H04R 3/005 |

FOREIGN PATENT DOCUMENTS

| CN | 106782593 B | 10/2019 | | |
| CN | 110931031 A | 3/2020 | | |
| TW | I-591624 B | 7/2017 | | |
| TW | I-671738 B | 9/2019 | | |
| WO | WO-2021046796 A1 * | 3/2021 | | H04R 1/10 |

OTHER PUBLICATIONS

Heigold, Georg et al., "End-to-End Text-Dependent Speaker Verification," 2016 IEEE International Conference on Acoustics, Speech and Signal Processing (ICASSP) (5 pages).

Ma, Edward, "Two Ways to Learn Audio Embeddings," https://pub.towardsai.net/two-ways-tolearn-audio-embeddings-9dfcaab10ba6), 2019, (4 pages).

Han et al., "Cosine similarity", Data Mining, (https://www.sciencedirect.com/topics/computerscience/cosine-similarity), 2012, 13 pages.

"Minimum mean square error (MMSE)," Wikipedia, https://en.wikipedia.org/wiki/Minimum_mean_square_error), Aug. 17, 2020. (12 pages).

* cited by examiner

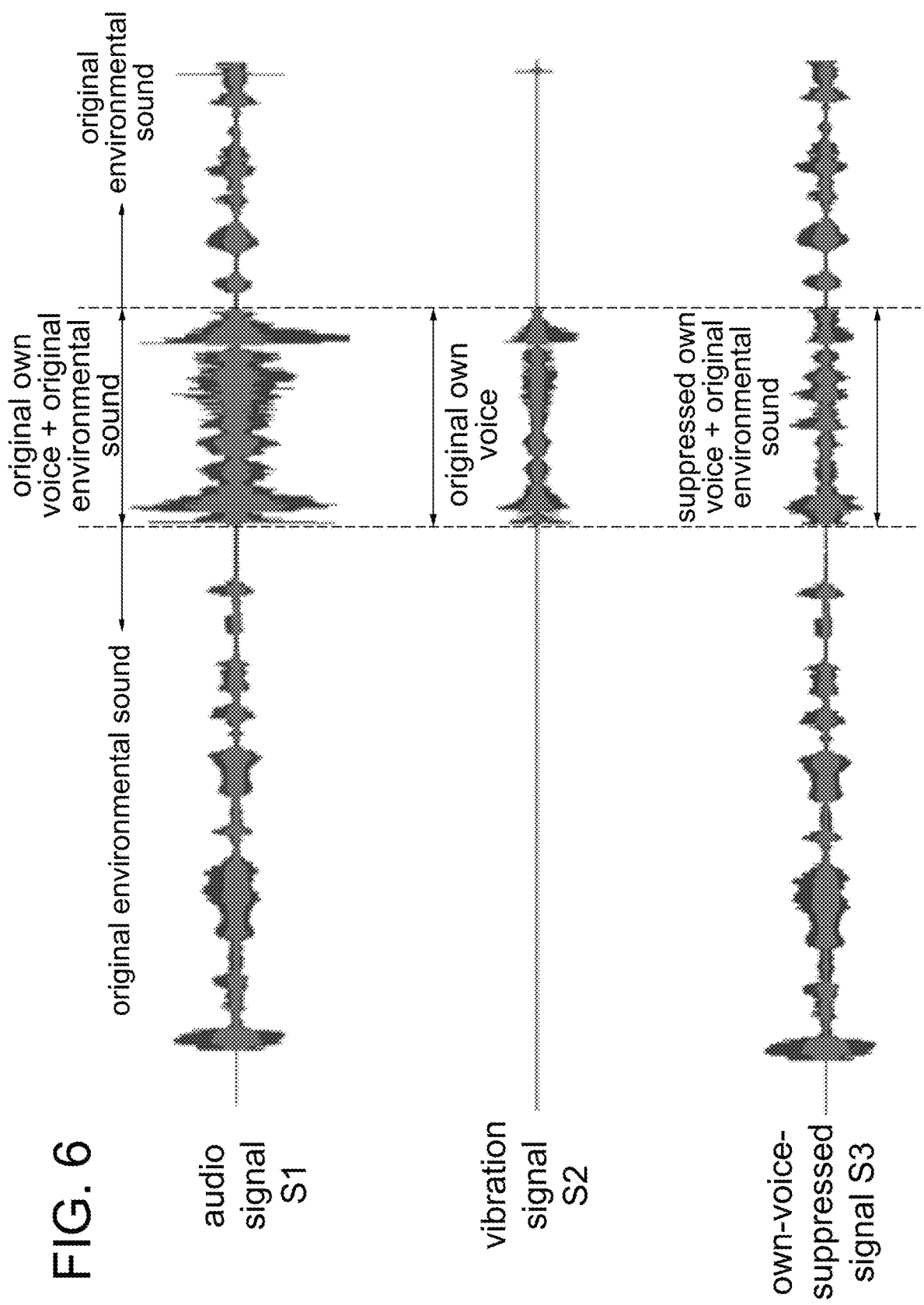

APPARATUS AND METHOD FOR OWN VOICE SUPPRESSION

CROSS-REFERENCE TO RELATED APPLICATION

This application claims priority under 35 USC 119(e) to U.S. provisional application No. 63/075,310, filed on SEP 08, 2020, the content of which is incorporated herein by reference in its entirety.

BACKGROUND OF THE INVENTION

Field of the Invention

The invention relates to voice signal processing, and more particularly, to an apparatus and method for own voice suppression applicable to a hearing aid.

Description of the Related Art

The aim of a hearing aid is to offer the best clarity and intelligibility in the presence of background noise or competing speech. Since the hearing aid is very close to the user's mouth, the most common complaint of hearing aid users is abnormally high voices while the user is speaking. This not only leaves the user feeling irritable or agitated, but also shields environmental sounds. Moreover, there is a potential risk of damage the hearing for the hearing aid users.

YAN disclosed a method of deep learning voice extraction and noise reduction method of combining bone conduction sensor and microphone signals in China Patent Pub. No. CN 110931031A. High-pass filtering or frequency band extending operation is performed over an audio signal from a bone conduction sensor to produce a processed signal. Then, both the processed signal and a microphone audio signal are fed into a deep neural network (DNN) module. Finally, the deep neural network module obtains the voice after noise reduction through prediction. Although YAN successfully extracts a target human voice in a complex noise scene and reduces interference noise, YAN fails to deal with the problem of abnormally high voices while the user is speaking.

The perception and acceptance of hearing aids is likely to be improved if the volume of the user's own voice can be reduced while the user is speaking.

SUMMARY OF THE INVENTION

In view of the above-mentioned problems, an object of the invention is to provide an own voice suppression apparatus for hearing aid users to improve comfort and speech intelligibility.

One embodiment of the invention provides an own voice suppression apparatus. The own voice suppression apparatus applicable to a hearing aid comprises: an air conduction sensor, an own voice indication module and a suppression module. The air conduction sensor is configured to generate an audio signal. The own voice indication module is configured to generate an indication signal according to at least one of user's mouth vibration information and user's voice feature vector comparison result. The suppression module coupled to the air conduction sensor and the own voice indication module is configured to generate an own-voice-suppressed signal according to the indication signal and the audio signal.

Another embodiment of the invention provides an own voice suppression method. The own voice suppression method, applicable to a hearing aid, comprises: providing an audio signal by an air conduction sensor; generating an indication signal according to at least one of user's mouth vibration information and user's voice feature vector comparison result; and generating an own-voice-suppressed signal according to the audio signal and the indication signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 show the waveforms of the audio signal S1, the vibration S2 and the own-voice-suppressed signal S3.

DETAILED DESCRIPTION OF THE INVENTION

Figure 1:
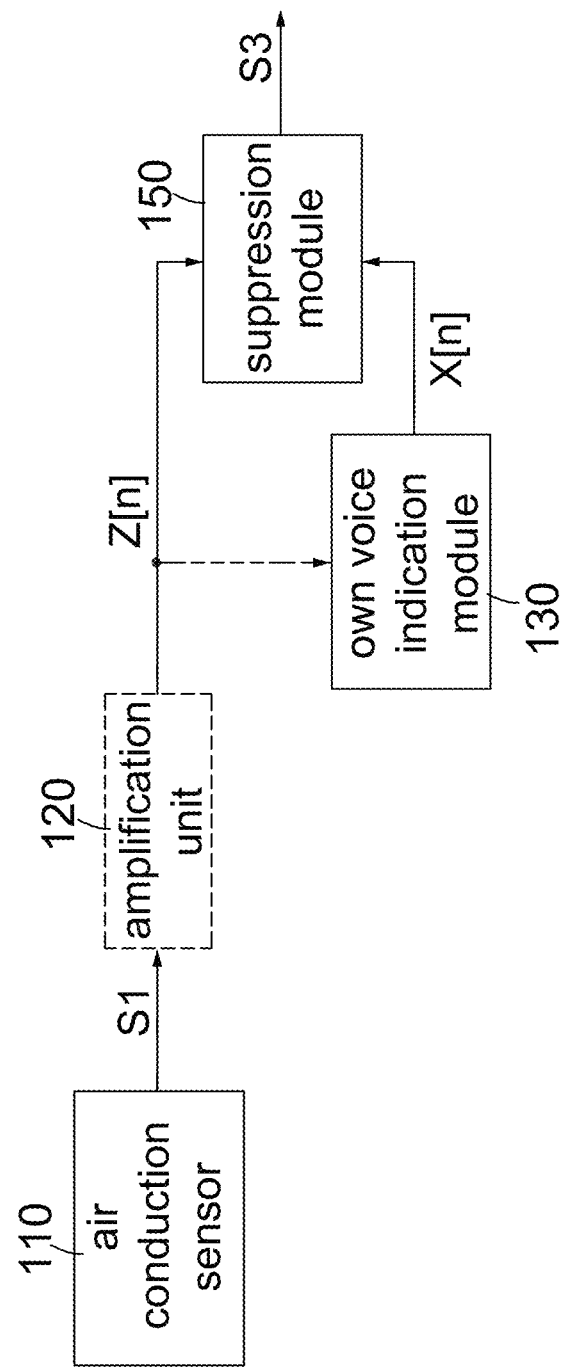
FIG. 1 is a block diagram showing an own voice suppression apparatus according to the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components and/or components with the same function are designated with the same reference numerals.

A feature of the invention is to use at least one of a bone conduction sensor 231 and a voice identification module 130B to identify/detect which frequency bins (or passbands) the user's own voice components are located and then suppress/reduce the user's own voice components according to their respective power levels in multiple detected frequency bins or passbands to prevent from damaging the user's hearing and shielding environmental sounds. Thus, it is likely to improve comfort and speech intelligibility for the hearing aid users.

FIG. 1 is a block diagram showing an own voice suppression apparatus according to the invention. Referring to FIG. 1, an own voice suppression apparatus 10 of the invention, applicable to a hearing aid, includes an air conduction sensor 110, an amplification unit 120, an own voice indication module 130 and a suppression module 150. The air conduction sensor 110 may be implemented by an electret condenser microphone (ECM) or a micro-electro-mechanical system (MEMS) microphone. The air conduction sensor 110 receives both the user's voices/speech/utterances and the environmental sounds to output an audio signal S1.

The amplification unit 120 is configured to increase the magnitude of its input audio signal S1 by a voltage gain to generate an amplified signal Z[n], where n denotes the discrete time index. The own voice indication module 130 generates an indication signal X[n] according to either user's mouth vibration information (e.g., a vibration signal S2 from a bone conduction sensor 231) and/or user's voice feature vector comparison result (e.g., matching scores from a voice identification module 130B). The suppression module 150 calculates a suppression mask according to the amplified signal Z[n] and the indication signal X[n], suppresses the power level for the own voice component contained in the amplified signal Z[n] and generates an own-voice-suppressed signal S3.

Figure 2A:
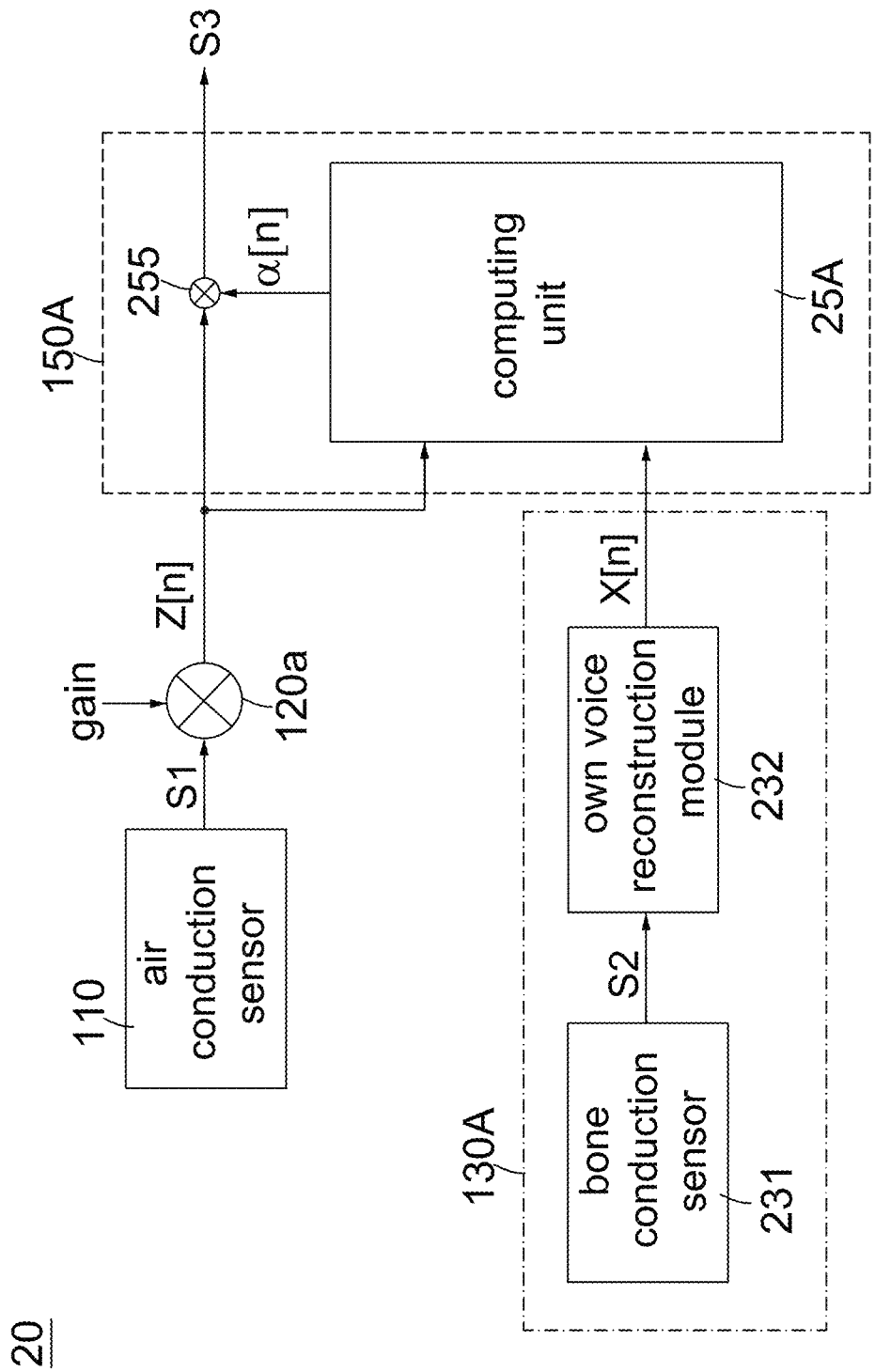
FIG. 2A is a block diagram showing an own voice suppression apparatus with a bone conduction sensor according to an embodiment of the invention.

FIG. 2A is a block diagram showing an own voice suppression apparatus with a bone conduction sensor according to an embodiment of the invention. Referring to FIG. 2A, an own voice suppression apparatus 20A of the invention, applicable to a hearing aid, includes an air conduction sensor 110, a multiplier 120a, an own voice indication module 130A and a suppression module 150A. In this embodiment, the amplification unit 120 in FIG. 1 is implemented by a multiplier 120a and the voltage gain varies according to the magnitude of its input audio signal S1 so that the magnitude of the amplified signal Z[n] falls within a predefined range. The amplification unit 120/120a is optional.

The own voice indication module 130A includes a bone conduction sensor 231 and an own voice reconstruction module 232. The bone conduction sensor 231 may be implemented by a MEMS voice accelerometer. As well known in the art, a voice accelerometer is configured to measure vibrations caused by speech/voice/mouth movement of the user, particularly at low frequencies, to output a vibration signal S2. The audio signal S1 and the vibration signal S2 may be analog or digital. If the signals S1 and S2 are analog, they may be digitized using techniques well known in the art. It is assumed that the amplified signal Z[n] and the reconstructed signal X[n] need to be digitized before being fed to the suppression module 150A. In general, the human voice/speech spans a range from about 125 Hz to 20 kHz. However, the bandwidth of the vibration signal S2 is normally restricted to a range from 0 to 3 kHz depending on the specification of the bone conduction sensor 231, and thus the vibration signal S2 usually sounds muffled. To solve this problem, the own voice reconstruction module 232 is provided to reconstruct the lost high-frequency components from the vibration signal S2 with a frequency range below 3 kHz by any existing or yet-to-be developed audio bandwidth extension approaches or high frequency reconstruction algorithms to generate a reconstructed signal X[n] with a frequency range extended up to 20 KHz. In an embodiment, the own voice reconstruction module 232 includes a deep neural network (not shown) that extracts feature values from the vibration signal S2 and then reconstructs its high-frequency components to generate a reconstructed signal X[n]. The deep neural network may be one or a combination of a recurrent neural network (RNN) and a convolutional neural network (CNN).

Figure 2B:
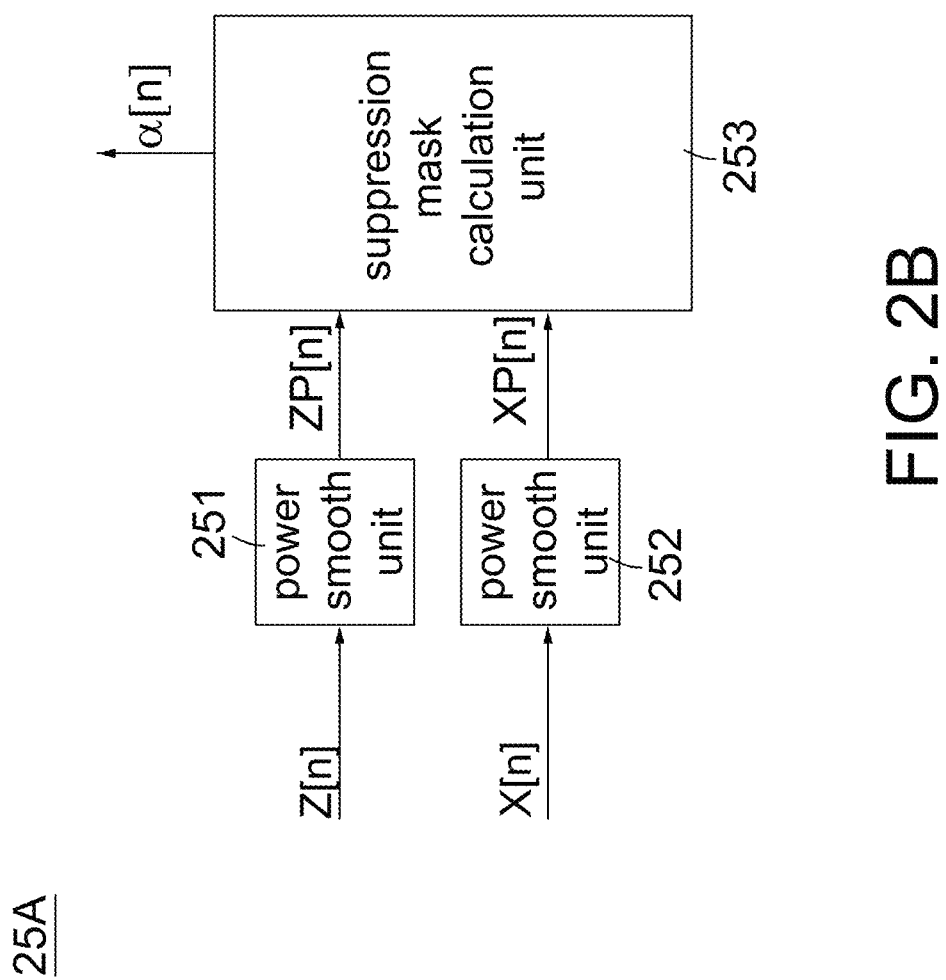
FIG. 2B is a block diagram showing the computing unit 25A according to an embodiment of the invention.

Assume that the noisy speech signal Z[n] can be expressed as Z[n]=v[n]+d[n], where v[n] is the clean speech, d[n] is the additive noise and n denotes the discrete time index. The suppression module 150A includes a computing unit 25A and a real-value multiplier 255. The computing unit 25A calculates a corresponding suppression mask ii[n] (i.e., sample by sample) according to the amplified signal Z[n] and the reconstructed signal X[n], where $0<=\alpha[n]<=1$. FIG. 2B is a block diagram showing the computing unit 25A according to an embodiment of the invention. Referring to FIG. 2B, the computing unit 25A includes two power smooth units 251 and 252 and a suppression mask calculation unit 253. In order to reduce noise interference, the speech power estimation is done in the power smooth unit 251 by averaging speech power values of the past and the current data samples of the amplified signal Z[n] while the vibration power estimation is done in the power smooth unit 252 by averaging vibration power values of the past and the current data samples of the reconstructed signal X[n], using a smoothing parameter. In one embodiment, the following infinite impulse response (IIR) equations are provided for the two power smooth units 251-252 to obtain an average speech power value ZP[n] for the amplified signal Z[n] and an average vibration power value XP[n] for the reconstructed signal X[n]:

$$ZP[n]=((1-b)\times ZP[n-1]+b\times Z^2[n]); \quad (1)$$

$$XP[n]=((1-b)\times XP[n-1]+b\times X^2[n]); \quad (2)$$

where b is a smoothing parameter whose value is selected in between [0, 1].

According to the disclosure "Single Channel Speech Enhancement: using Wiener Filtering with Recursive Noise estimation", disclosed by Upadhyay et al, Procedia Computer Science 84 (2016) 22-30, the gain $H_{wiener}(\omega)$ of a wiener filter with recursive noise estimation is given by:

$$H_{wiener}(\omega) = \frac{P_{SP}(\omega) - P_{NP}(\omega)}{P_{SP}(\omega)}; \quad (3)$$

where $P_{SP}(\omega)$ is the noisy speech power spectrum, $P_{NP}(\omega)$ is the noise power spectrum and cv is the frequency bin index. According to the equation (3), the suppression mask calculation unit 253 calculates the suppression mask α[n] for the current sample Z[n] in time domain as follows:

$$\alpha[n] = \frac{ZP[n] - XP[n]}{ZP[n]}, \quad (4)$$

where 0<=α[n]<=1.

Please note that the above equation (4) is provided by way of example, but not limitations of the invention. Any other type of equations are applicable to the suppression mask calculation unit 253 as long as they satisfies the inversely proportional relationship between X[n] and α[n]. In brief, the greater the magnitude (or the power value) of X[n], the greater the own voice component contained in Z[n] and thus the less the suppression mask α[n] becomes for own voice suppression.

Then, the multiplier 255 is configured to multiply the amplified signal Z[n] by its corresponding suppression mask α[n] (sample by sample) to generate the own-voice-suppressed signal S3[n]. In this manner, the invention avoids abnormally high volume of hearing aids while the user is speaking. However, since the multiplication of the amplified signal Z[n] and the suppression mask α[n] is operated in time domain, it is likely that the environmental sounds as well as the user's voices contained in the amplified signal Z[n] would be suppressed at the same time.

Figure 3A:
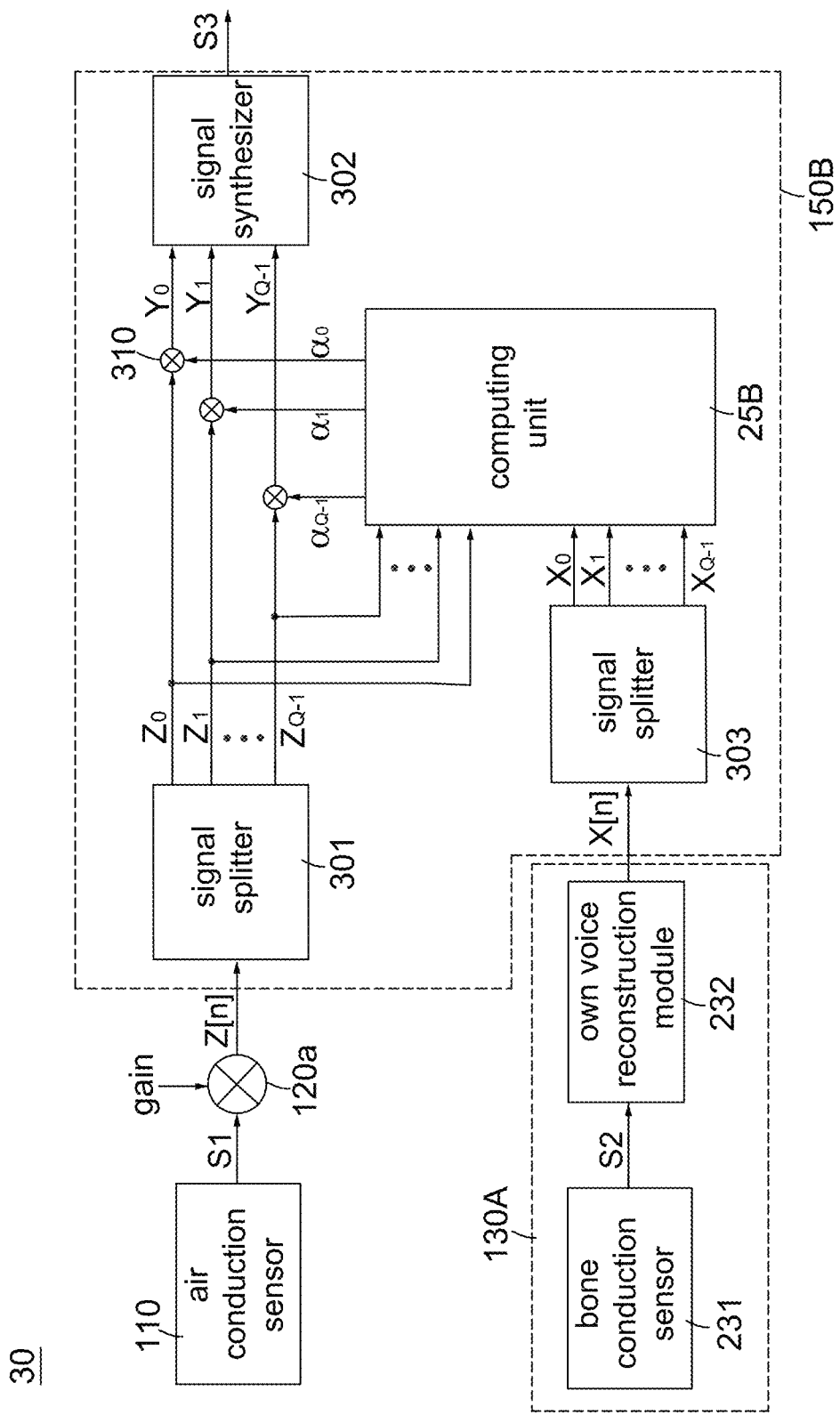
FIG. 3A is a block diagram showing an own voice suppression apparatus with a bone conduction sensor according to an embodiment of the invention.

FIG. 3A is a block diagram showing an own voice suppression apparatus with a bone conduction sensor according to an embodiment of the invention. Referring to FIG. 3A, an own voice suppression apparatus 30 of the invention, applicable to a hearing aid, includes an air conduction sensor 110, a multiplier unit 120a, an own voice indication module 130A and a suppression module 150B. The suppression module 150B includes a computing unit 25B, Q multipliers 310, two signal splitters 301/303 and a signal synthesizer 302. The signal splitter 301 splits the input signal Z[n] into Q first signal components $(Z_0 \sim Z_{Q-1})$ and the signal splitter 303 splits the input signal X[n] into Q second signal components $(X_0 \sim X_{Q-1})$, where Q>=1. Then, the computing unit 25B calculates Q suppression masks $(\alpha_0 \cdot \alpha_{Q-1})$ according to the Q first signal components $(Z_0 \sim Z_{Q-1})$ and the Q second signal components $(X_0 \sim X_{Q-1})$. The Q multipliers 310 respectively multiply the Q second suppression masks $(\alpha_0 \sim \alpha_{Q-1})$ by their corresponding first signal components $(Z_0 \sim Z_{Q-1})$ to generate Q multiplied signals $(Y_0 \sim Y_{Q-1})$ Finally, the signal synthesizer 302 reconstructs the own-voice-suppressed signal S3 in time domain according to the Q multiplied signals $(Y_0 \sim Y_{Q-1})$. The signal splitters 301/303 in FIGS. 3A, 4A and 5A may be implemented by either transformers 301a/303a or an analysis filter bank 301b/303b while the signal synthesizer 302 in FIGS. 3A, 4A and 5A may be implemented by either an inverse transformer 302a or a synthesis filter bank 302b. Please note that the multipliers 310 may be implemented by complex-value multipliers 311 (together with the $Z_0 \sim Z_{Q-1}$ values being complex values) or real-value multipliers 255 (together with the $Z_0 \sim Z_{Q-1}$ values being real values).

Figure 3B:
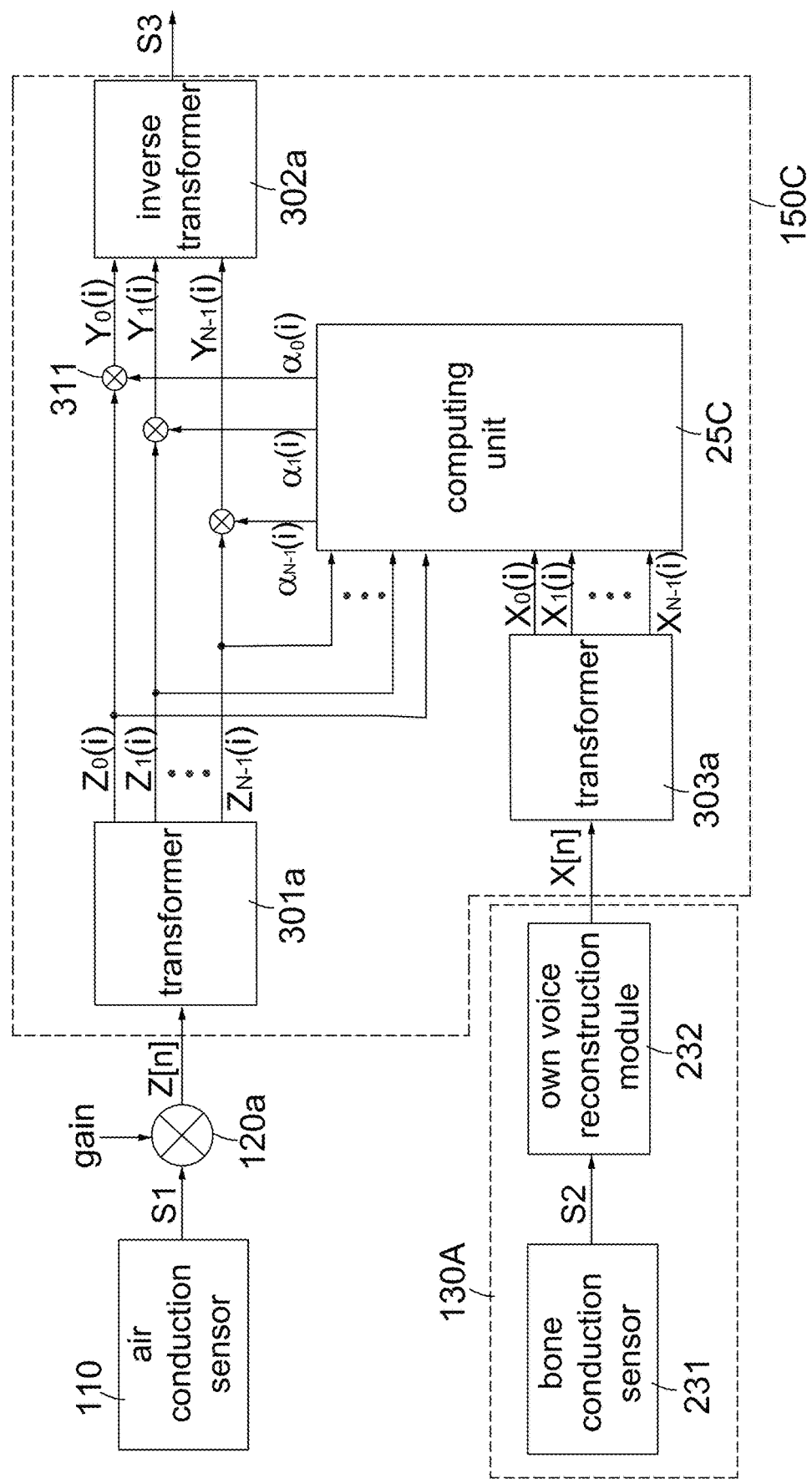
FIG. 3B is a block diagram showing an own voice suppression apparatus with a bone conduction sensor according to another embodiment of the invention.

FIG. 3B is a block diagram showing an own voice suppression apparatus with a bone conduction sensor according to another embodiment of the invention. Comparing to FIG. 3A, the signal splitters 3011303 are implemented by transformers 301a/303a while the signal synthesizer 302 is implemented by an inverse transformer 302a. Accordingly, the computing unit 25C calculates N suppression masks $\alpha_k(i)$ for N frequency bins according to a current speech spectral representation for a current frame i of the amplified signal Z[n] and a current vibration spectral representation for a current frame i of the reconstructed signal X[n], where 0<=k<=(N−1), N is the length of each frame and i is the current frame index.

The transformers 301a and 303a is implemented to perform a fast Fourier transform (FFT), a short-time Fourier transform (STFT) or a discrete Fourier transform (DFT) over its input signals. Specifically, the transformers 301a and 303a respectively convert audio data of current frames of the signals Z[n] and X[n] in time domain into complex data $(Z_0 \sim Z_{N-1}$ and $X_0 \sim X_{N-1})$ in frequency domain. The inverse transformer 302a is used to transform the complex data $(Y_0 \sim Y_{N-1})$ in frequency domain into the audio signal S3 in time domain for each frame. For purpose of clarity and ease of description, hereinafter, the following examples and embodiments will be described with the transformers 301a and 303a performing the FFT operations over each frame of their input signals. Assuming that a number of sampling points (or FFT size) is N and the time duration for each frame is Td, the transformer 303a divides the reconstructed signal X[n] into a plurality of frames and computes the FFT of the current frame i to generate a current vibration spectral representation having N complex-valued samples $(X_0 \sim X_{N-1})$ with a frequency resolution of fs/N(=1/Td). Here, fs denotes a sampling frequency of the reconstructed signal X[n] and each frame corresponds to a different time interval of the reconstructed signal X[n]. Likewise, the transformer 301a respectively divides the amplified signal Z[n] into a plurality of frames and computes the FFT of the current frame to generate a current speech spectral representation having N complex-valued samples $(Z_0 \sim Z_{N-1})$ with a frequency resolution of fs/N. In a preferred embodiment, the time duration Td of each frame is about 8~32 milliseconds (ms), and successive frames overlap by less than Td, such as by Td/2.

Figure 3C:
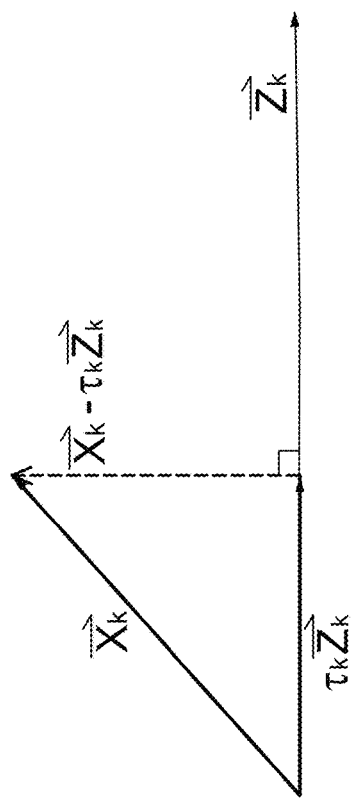
FIG. 3C shows a relationship between an own voice complex-valued sample $X_k$ and a speech complex-valued sample $Z_k$ for the same frequency bin k.

FIG. 3C shows a relationship between a vibration complex-valued samples $X_k$ and a speech complex-valued sample $Z_k$ for the same frequency bin k. Referring to FIG. 3C, two vectors $\vec{X}_k$ and $\vec{Z}_k$ respectively representing two complex-valued samples $X_k$ and $Z_k$ for the same frequency bin k point to different directions. A vector $\tau_k \vec{Z}_k$, the projection of $\vec{X}_k$ on $\vec{Z}_k$, represents an own voice component on $\vec{Z}_k$. According to the definition of linear minimum mean square error (MMSE) estimator (please go to the web site: https://en.wikipedia.org/wiki/Minimum_mean_square_error), we deduce the suppression mask $\alpha_k$ for frequency bin k as follows. Since the two vectors ($\vec{X_k}-\tau_k\vec{Z_k}$) and $\vec{Z_k}$ are orthogonal, $$E[(X_k-\tau_k Z_k)(Z_k)^*]=0$$

$$\Rightarrow E[(X_k(Z_k)^*)]=\tau_k E[Z_k(Z_k^*)]=T_k E[(|Z_k|^2)]$$

$\Rightarrow$ $$\tau k = \frac{E[X_k(Z_i)^*]}{E[(|Z_k|)^2]},$$

where E[.] denotes an expectation value.

After the own voice component $\tau_k \vec{Z_k}$ is subtracted from 4, scalars are calculated as follows:

$(Z_k - \tau_k Z_k) =$ $$Z_k(1-\tau_k) = Z_k\left(1 - \frac{E[X_k(Z_k)^*]}{E[(|Z_k|)^2]}\right) = Z_k \times \left(\frac{E[(|Z_k|)^2] - E[X_k(Z_k)^*]}{E[(|Z_k|)^2]}\right).$$

Thus, the suppression mask $$\alpha_k = \frac{E\{(|Z_k|)^2\} - E[X_k Z_k)^*]}{E[(|Z_k|)^2]}. \tag{4a}$$

Figure 3D:
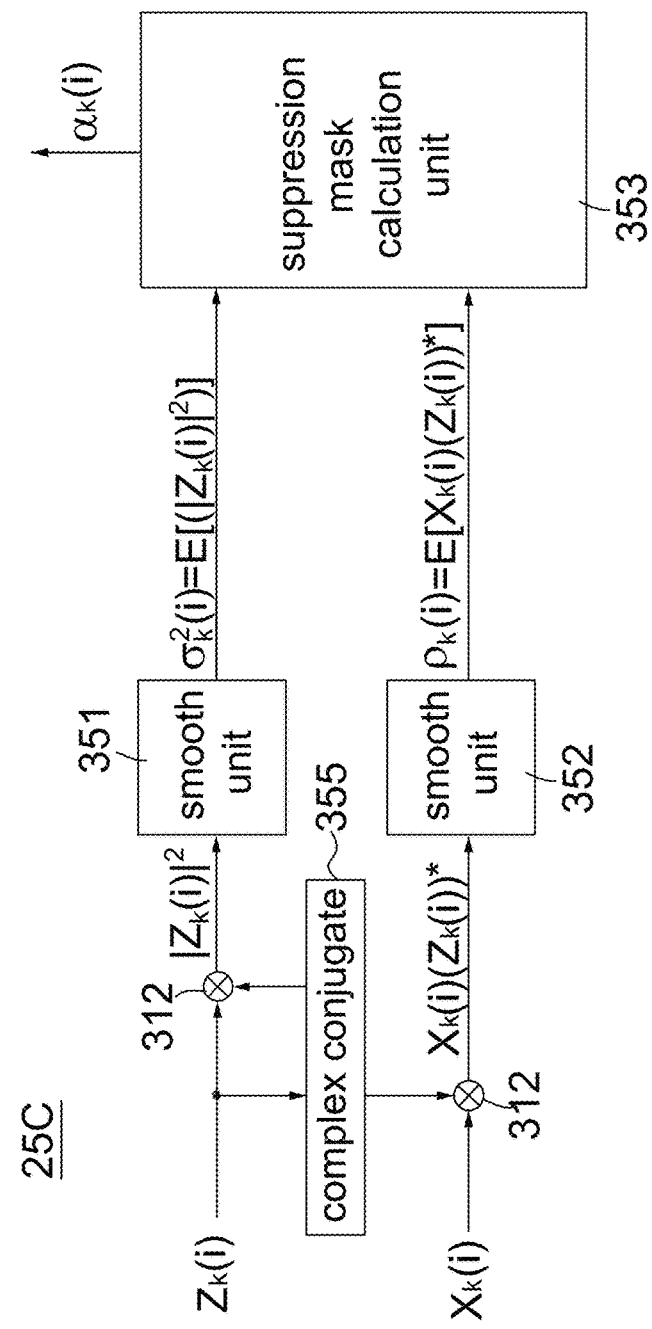
FIG. 3D is a block diagram showing the computing unit 25C according to an embodiment of the invention.

FIG. 3D is a block diagram showing the computing unit 25C according to an embodiment of the invention. Referring to FIG. 3D, the computing unit 25C includes two complex-value multipliers 312, a complex conjugate block 355, two smooth units 351 and 352 and a suppression mask calculation unit 353. According to the current speech spectral representation, the complex-value multiplier 312 multiplies each complex-valued sample $Z_k(i)$ by its complex conjugate rgi from the complex conjugate block 355 to generate a product of $|Z_k(i)|^2$. The smooth unit 351 firstly computes the power level $|Z_k(i)|^2$ for each frequency bin k to obtain a current speech power spectrum for the current frame of the amplified signal Z[n] according to the equation: $|Z_k(i)|^2=z_{kr}^2+z_{ki}^2$, where denotes a real part of the complex-valued sample $Z_k(i)$, $z_{ki}$ denotes an imaginary part complex-valued sample $Z_k(i)$, and 0<=k<=(N−1). Then, to reduce noise interference, similar to the above equation (1), the following IIR equation (5) is provided for the smooth unit 351 to obtain an average speech power value:

$$\sigma_k^2=(1-b)\times\sigma_k^2(i-1)+b\times|Z_k(i)|^2; \tag{5}$$

where b is a smoothing parameter whose value is selected in between [0, 1], i is the current frame index and (i−1) is a previous frame index. In other words, $\sigma_k^2=E[|Z_k(i)|^2]$.

According to the current vibration spectral representation and the current speech spectral representation, the complex-value multiplier 312 multiplies each complex-valued sample $X_k(i)$ by the complex conjugate $Z^*_k(i)$ from the complex conjugate block 355 to generate a product of $X_k(i)Z_k(i)^*$. The smooth unit 352 calculates a product complex value $X_k(i)Z_k(i)^*$ for each frequency bin k to obtain a current product spectrum for the current frame i of the reconstructed signal X[n], where 0<=k<=N−1. Then, similar to the above equations (2) and (5), to reduce noise interference, the following IIR equation (6) is provided for the smooth unit 352 to obtain an average product complex value:

$$\rho_k(1-b)\times\rho_k(i-1)+b\times X_k(i)Z_k(i))^*. \tag{6}$$

In other words, $\rho_k(i)=E[X_k(i)(Z_k(i))^*]$.

Afterward, according to the equations (3) and (4a), the average speech power value $\sigma_k^2(i)$ and the average product complex value $\rho_k(i)$, the suppression mask calculation unit 353 calculates the suppression mask $\alpha_k(i)$ for a frequency bin k associated with the current frame i of the amplified signal Z[n] as follows:

$$\alpha_k(i) = \frac{\sigma_k^2(i) - \rho_k(i)}{\sigma_k^2(i)} = \frac{E\{(|Z_k(i)|)^2\} - E[X_k(i)(Z_i(i))^*]}{E[(|Z_k(i)|)^2]}. \tag{7}$$

Please note that the outputted samples ($Z_0(i) \sim Z_{N-1}(i)$) from the transformers 301a are complex values, so the suppression masks $\alpha_k(i)$ are also complex values and hereinafter called "complex masks".

Next, the N complex-value multipliers 311 respectively multiply the N complex-valued samples $Z_k(i)$ by the N suppression masks $\alpha_k(i)$ for the N frequency bins to generate N complex-valued samples $Y_k(i)$, where 0<=k<=N−1. Finally, the inverse transformer 302a performs IFFT over the N complex-valued samples $Y_0(i) \cdot Y_{N-1}(i)$ in frequency domain to generate the own-voice-suppressed signal S3 for the current frame i in time domain. Please note that the above equation (7) is provided by way of example, but not limitations of the invention. Any other type of equations are applicable to the suppression mask calculation unit 353 as long as they satisfies the inversely proportional relationship between $X_k(i)$ and $\alpha_k(i)$. In brief, the greater the magnitude of $X_k(i)$, the greater the own voice component in the frequency band k of the current speech spectral representation is and thus the less the suppression mask $\alpha_k(i)$ becomes for own voice suppression.

Figure 3E:
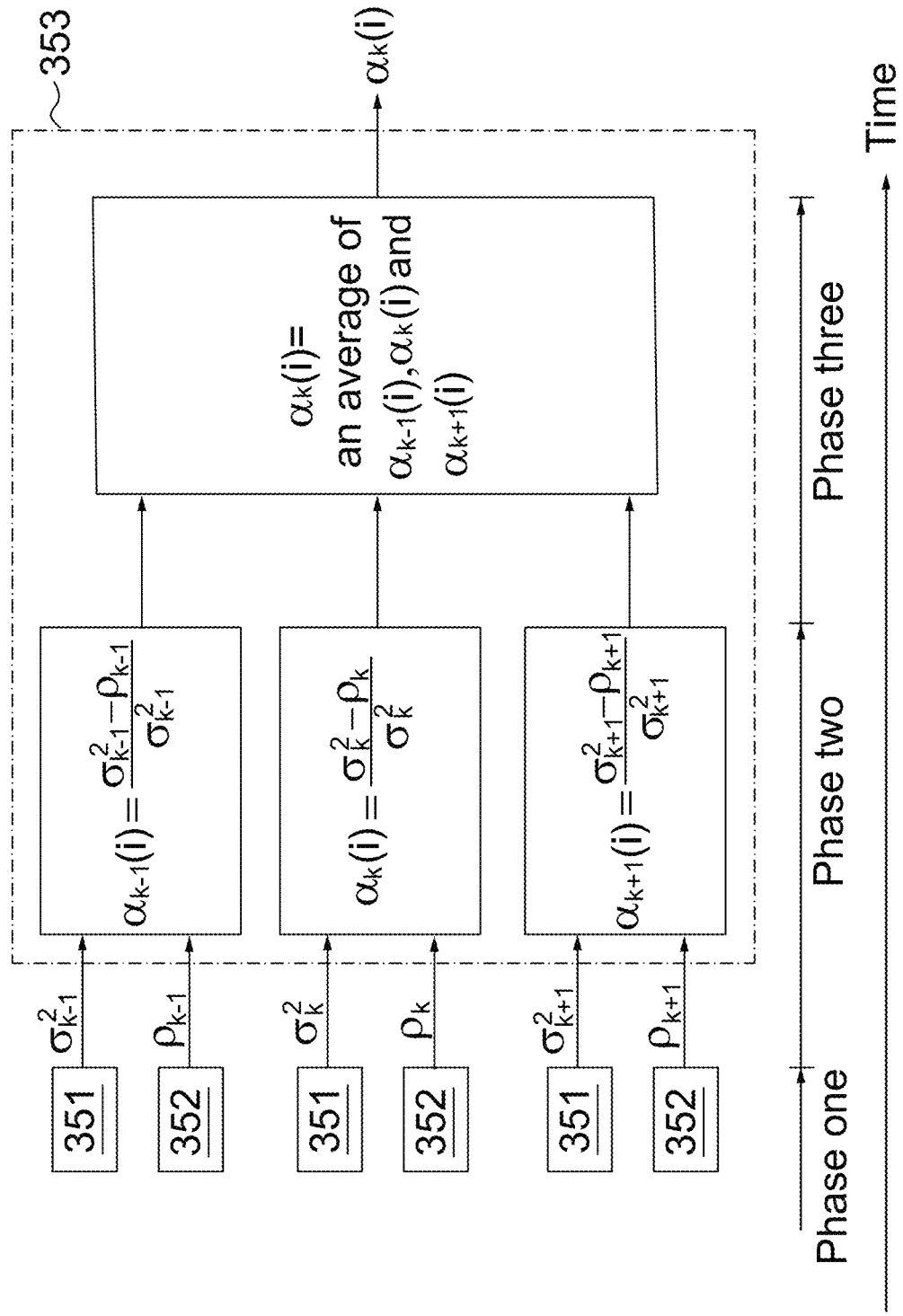
FIG. 3E shows a timing diagram of calculating the suppression mask $\alpha_k(i)$ according to three (i.e., L=3) average speech power values and three average product complex values of three frequency bins in the invention.

Please note that in equation (7), the suppression mask $\alpha_k(i)$ for a frequency bin k is calculated according to the average speech power value $\sigma_k^2(i)$ and the average product complex value $\rho_k(i)$ of the same frequency bin k. In an alternative embodiment, the suppression mask $\alpha_k(i)$ for a frequency bin k is determined according to L average speech power values and L average product complex values of L frequency bins adjacent to the frequency bin k, where L>=1. FIG. 3E shows a timing diagram of calculating the suppression mask $\alpha_k(i)$ for a frequency bin k according to three (i.e., L=3) average speech power values and three average product complex values of three frequency bins adjacent to the frequency bin k in the invention. Referring to FIG. 3E, the whole process of calculating the suppression mask $\alpha_k(i)$ by the computing unit 25C is divided into three phases. In phase one, the smooth unit 351 respectively calculates three average speech power values $\sigma_{k-1}^2(i)$, $\sigma_k^2(i)$ and $\sigma_{k+1}^2(i)$ for three frequency bins (k−1), k and (k+1) according to the equation (5) and the three power levels $|Z_{k-1}(i)|^2$, $|Z_k(i)|^2$ and $|Z_{k+1}(i)|^2$. Meanwhile, the smooth unit 352 respectively calculates the average product complex values $\rho_{k-1}(i)$, $\rho_k(i)$ and $\rho_{k+1}(i)$ for three frequency bins (k−1), k and (k+1) according to the equation (6) and the three product complex-valued samples $X_{k-1}(i)(Z_{k-1}(i))^*$, $X_k(Z_k(i))^*$ and $X_{k+1}(i)(Z_{k+1}(i))^*$. In phase two, the suppression mask calculation unit 353 calculates: (i) a suppression mask $\alpha_{k-1}(i)$ for a frequency bin (k−1) according to the equation (7), the average speech power value $\sigma_{k-1}^2(i)$ and the average product complex value $\rho_{k-1}(i)$; (ii) a suppression mask $\alpha_k(z)$ for a frequency bin k according to the equation (7), the average speech power value $\sigma_k^2(i)$ and the average product complex value $\rho_k(i)$; and (iii) a suppression mask $\alpha_{k+1}(i)$ for a frequency bin (k+1) according to the equation (7), the average speech power value $\sigma_{k+1}^2(i)$ and the average product complex value $\rho_{k+1}(i)$. In phase three, the suppression mask calculation unit 353 calculates an average value of the three suppression masks ($\alpha_{k-1}(i)$, $\alpha_k(i)$, $\alpha_{k+1}(i)$) of the three frequency bins ((k−1), k, (k+1)) and then updates the suppression mask $\alpha_k(i)$ for the frequency bin k with the average value. Please note that FIG. 3D (i.e., L=1) is a special case of FIG. 3E.

Figure 3F:
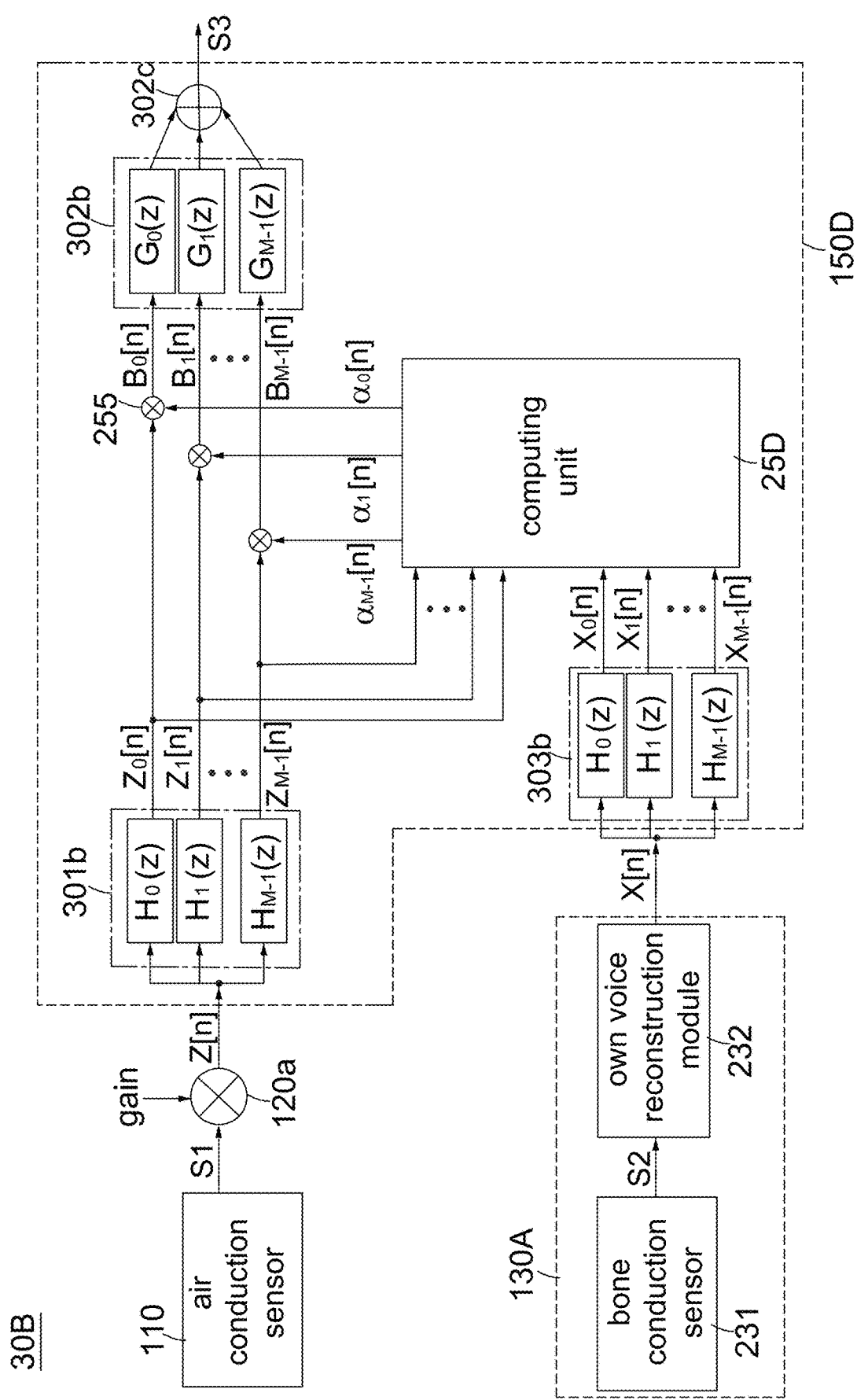
FIG. 3F is a block diagram showing an own voice suppression apparatus with a bone conduction sensor according to another embodiment of the invention.

FIG. 3F is a block diagram showing an own voice suppression apparatus with a bone conduction sensor according to another embodiment of the invention. In comparison with the own voice suppression apparatus 30 in FIG. 3A, the signal splitters 301/303 are implemented by analysis filter banks 301b/303b while the signal synthesizer 302 is implemented by a synthesis filter bank 302b and an adder 302c.

Figure 3G:
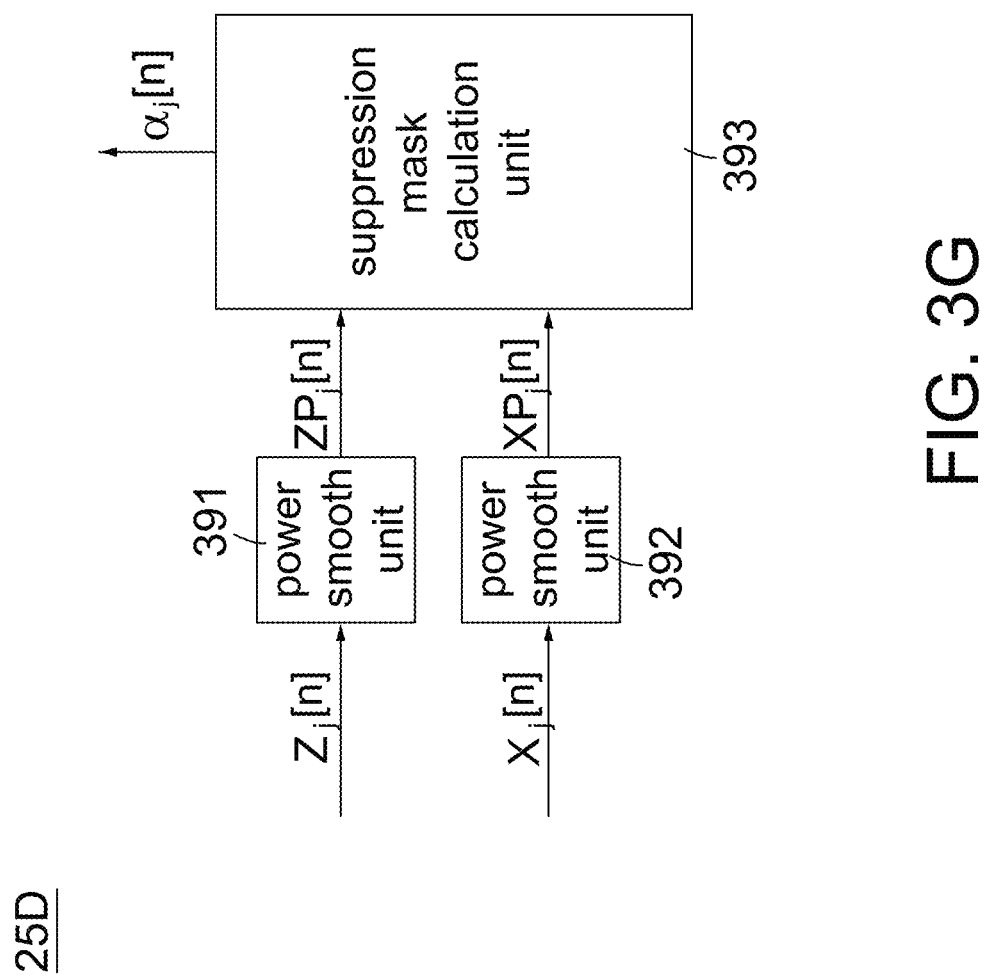
FIG. 3G is a block diagram showing the computing unit 25D according to an embodiment of the invention.

Referring to FIG. 3F, the amplified signal Z[n] is decomposed into M speech sub-band signals $Z_0[n] \sim Z_{M-1}[n]$ by applying M analysis filters of the analysis filter bank 301b with M different passbands. Likewise, the reconstructed signal X[n] is decomposed into M vibration sub-band signals $X_0[n] \sim X_{M-1}[n]$ by applying M analysis filters of the analysis filter bank 303b with M different passbands. Thus, each of the speech sub-band signals $Z_0[n] \sim Z_{M-1}[n]$ (in time domain) carries information on the amplified signal Z[n] in a particular frequency band while each of the vibration sub-band signals $X_0[n] \sim X_{M-1}[n]$ (in time domain) carries information on the reconstructed signal X[n] in a particular frequency band. In an embodiment, the bandwidths of the M passbands of the M analysis filters of the analysis filter bank 301b/303b are equal. In an alternative embodiment, the bandwidths of the M passbands of the M analysis filters of the analysis filter bank 301b/303b are not equal; moreover, the higher the frequency, the wider the bandwidths of the M passbands of the M analysis filters. Then, the M real-value multipliers 255 respectively multiply M speech sub-band signals $Z_0[n] \sim Z_{M-1}[n]$ by M suppression masks $\alpha_0[n] \sim \alpha_{M-1}[n]$ to generate M modified signals $B_0[n] \sim B_{M-1}[n]$. Next, M synthesis filters of the synthesis filter bank 302b respectively perform interpolation over the M modified signals $B_0[n] \sim B_{M-1}[n]$ to generate M interpolated signals. Finally, the M interpolated signals are combined by the adder 302c to reconstruct the own-voice-suppressed signal S3. Referring to FIG. 3G, the computing unit 25D includes two power smooth units 391 and 392 and a suppression mask calculation unit 393. Analogous to the equations (1) and (2), the following IIR equations are provided for the two power smooth units 391-392 to obtain an average speech power value $ZP_j[n]$ for the speech sub-band signal $Z_j[n]$ and an average vibration power value $XP_j[n]$ for the vibration sub-band signal $X_j[n]$:

$$ZP_j[n]=((1-b) \times ZP_j[n-1]+b \times Z_j^2[n]); \quad (8)$$

$$XP_j[n]=((1-b) \times XP_j[n-1]+b \times X_j^2[n]); \quad (9)$$

where b is a smoothing parameter whose value is selected in between [0, 1], j is the passband index, n is the discrete time index and 0<=j<=(M−1).

Analogous to the equation (4), the suppression mask calculation unit 393 calculates the suppression mask $\alpha_j[n]$ for the speech sub-band signal $Z_j[n]$ as follows:

$$a_j[n] = \frac{ZP_j[n] - XP_j[n]}{ZP_j[n]}. \quad (10)$$

Please note that the outputted samples ($Z_0[n] \sim Z_{M-1}[n]$) from the filter bank 301b are real values, so the suppression masks $\alpha_j[n]$ are also real values and hereinafter called "real masks". Please note that in equation (10), the suppression mask $\alpha_j[n]$ for the speech sub-band signal $Z_j[n]$ is calculated according to the average speech power value $ZP_j[n]$ and the average vibration power value $XP_j[n]$ of the same passband j. In an alternative embodiment, similar to the three-phase process in FIG. 3E, the suppression mask $\alpha_3[n]$ for the speech sub-band signal $Z_j[n]$ corresponding to the passband j is determined according to L average speech power values of L speech sub-band signals and L average vibration power values of L vibration sub-band signals, where L>=1 and the passbands of the L speech sub-band signals and the L vibration sub-band signals are adjacent to the passband j. For example, if L=3, the computing unit 25D computes three suppression masks ($\alpha_{j-1}[n]$, $\alpha_j[n]$ and $\alpha_{j+1}[n]$) of three speech sub-band signals ($Z_{j-1}[n]$, $Z_j[n]$ and $Z_{j+1}[n]$) with their passbands adjacent to the passband j based on equation (10), three average speech power values of the three speech sub-band signals and three average vibration power values of three vibration sub-band signals ($X_{j-1}[n]$, $X_j[n]$ and $X_{j+1}[n]$), computes an average value of the three suppression masks and then updates the suppression mask $\alpha_j[n]$ for the speech sub-band signal $Z_j[n]$ with the average value. Please note that the above equation (10) is provided by way of example, but not limitations of the invention. Any other type of equations are applicable to the suppression mask calculation unit 393 as long as it satisfies the inversely proportional relationship between $X_j[n]$ and $\alpha_j[n]$. In brief, the greater the magnitude (or power value) of $X_j[n]$, the greater the own voice component in the passband j (or the speech sub-band signal $Z_j[n]$) is and thus the less the suppression mask $\alpha_j[n]$ becomes for own voice suppression.

Figure 4A:
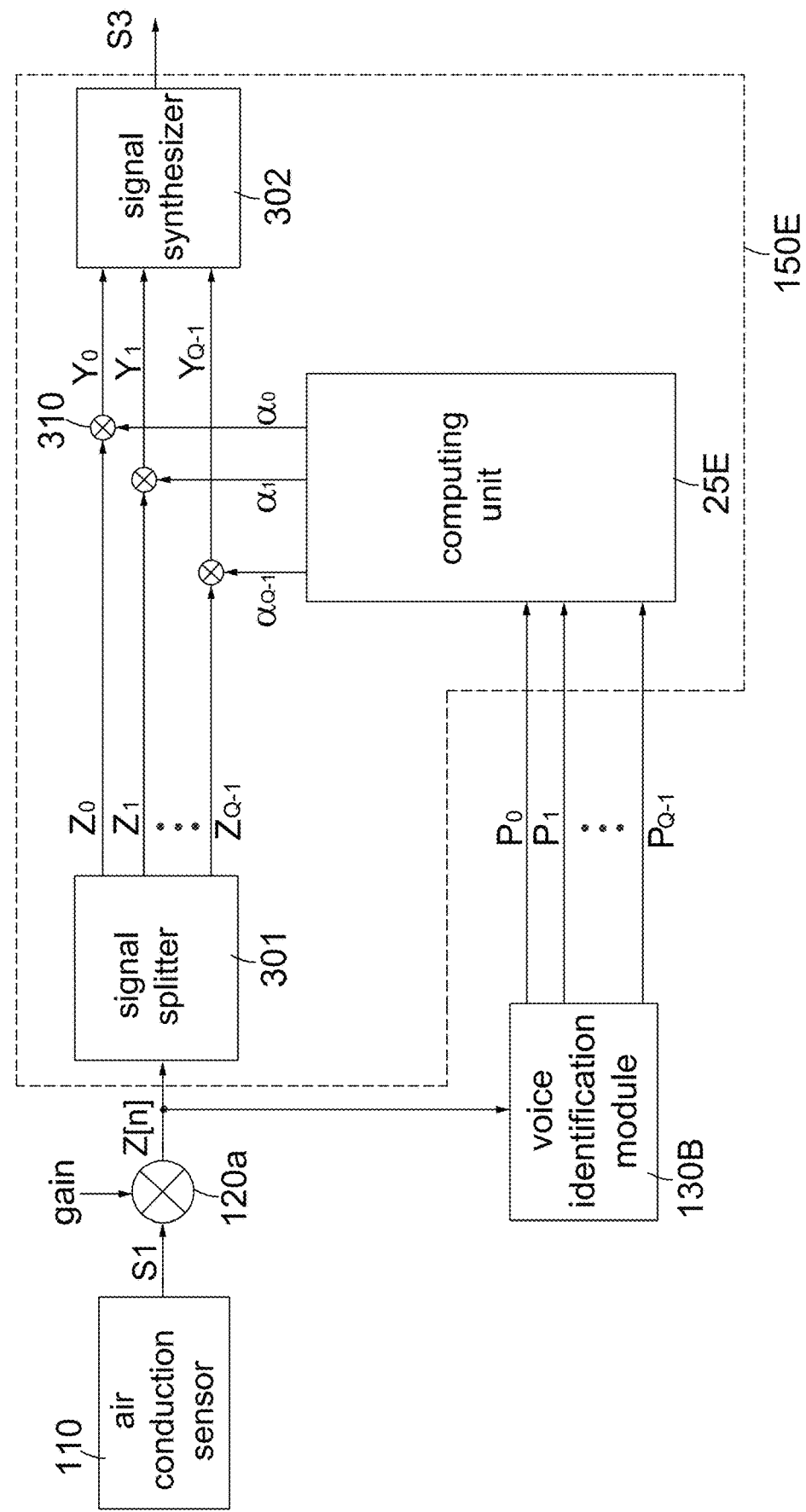
FIG. 4A is a block diagram showing an own voice suppression apparatus with a voice identification module according to an embodiment of the invention.

FIG. 4A is a block diagram showing an own voice suppression apparatus with a voice identification module according to an embodiment of the invention. In comparison with the own voice suppression apparatus 30 in FIG. 3A, a main difference is that the own voice indication module 130A is replaced with a voice identification module 130B and the signal components ($Z_0 \sim Z_{Q-1}$) are not fed to the computing unit 25E. The voice identification module 130B receives the amplified signal Z[n] to generate Q matching scores ($P_0 \sim P_{Q-1}$) corresponding to Q signal components $Z_0 \sim Z_{Q-1}$. Then, the computing unit 25E calculates Q suppression masks ($\alpha_0 \cdot \alpha_{Q-1}$) according to the Q matching scores ($P_0 \sim P_{Q-1}$).

Figure 4B:
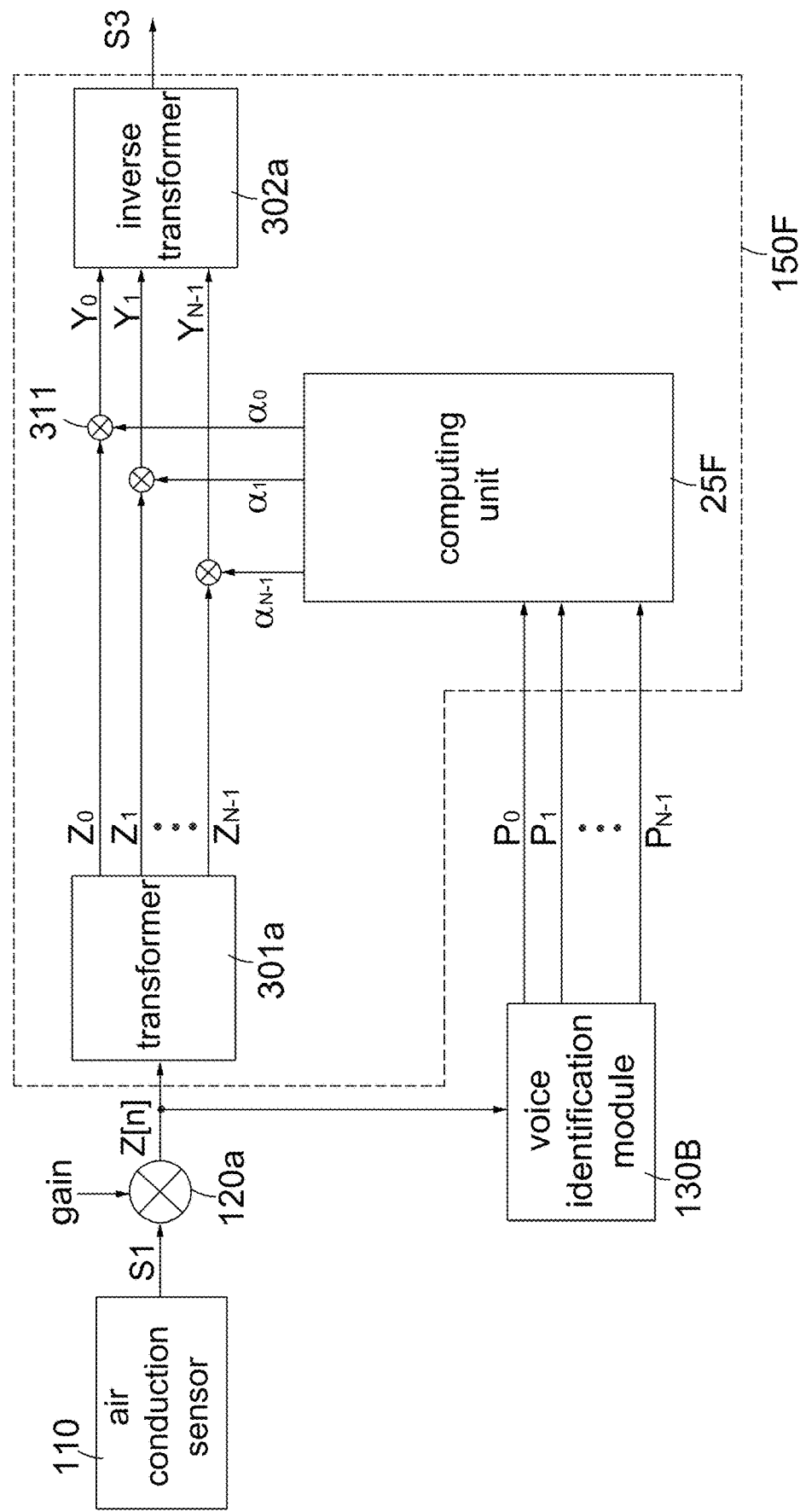
FIG. 4B is a block diagram showing an own voice suppression apparatus with a voice identification module according to another embodiment of the invention.

FIG. 4B is a block diagram showing an own voice suppression apparatus with a voice identification module according to another embodiment of the invention. In comparison with the own voice suppression apparatus 40 in FIG. 4A, the signal splitter 301 is implemented by a transformer 301a while the signal synthesizer 302 is implemented by an inverse transformer 302a. The voice identification module 130B receives the amplified signal Z[n] to generate N matching scores $P_k$ corresponding to N frequency bins of the current speech spectral representation associated with a current frame z of Z[n], where 0<=k<=(N−1) and N is the length of each frame of the amplified signal Z[n]. Each matching score $P_k$ is bounded between 0 and 1. Thus, if any matching score $P_k$ gets close to 1, it indicates that the magnitude of the user's own voice component gets greater in the frequency bin k; otherwise, if any matching score $P_k$ gets close to 0, it indicates that the magnitude of the user's own voice component gets smaller in this frequency bin k. According to the N matching scores $P_0 \sim P_{N-1}$, the computing unit 25F calculates a suppression mask $\alpha_k$ for each frequency bin k using the following equation:

$$\alpha_k = (1 - P_k), \tag{11}$$

where $0 <= \alpha_k <= 1$. Please note that since $P_k$ is real number, the suppression mask $\alpha_k$ is a real mask.

Please note that the above equation (11) is provided by way of example, but not limitations of the invention. Any other type of equations is applicable to the computing unit 25F as long as it satisfies the inversely proportional relationship between $\alpha_k$ and $P_k$. In brief, the greater the magnitude of $P_k$, the greater the magnitude of the user own voice component in the frequency band k of the current speech spectral representation is and thus the less the suppression mask $\alpha_k$ becomes for own voice suppression. In an alternative embodiment, similar to the three-phase process in FIG. 3E, the suppression mask $\alpha_k(i)$ for a frequency bin k is determined according to L matching scores of L frequency bins adjacent to the frequency bin k. For example, the computing unit 25F calculates L suppression masks of the L frequency bins adjacent to the frequency bin k according to the L matching scores of the L frequency bins, calculates an average value of the L suppression masks and then updates the suppression mask $\alpha_k(i)$ for the frequency bin k with the average value, where L>=1.

The advantage of the voice identification module 130B is capable of identifying which frequency bins the user's own voice components are located and how strong the user's own voice components are. With this indication, the user's own voice components in the identified frequency bins can be suppressed precisely while the magnitudes of the sound components in the other frequency bins (representative of environmental sounds) are retained.

Figure 4C:
FIG. 4C is a block diagram showing a voice identification module according to an embodiment of the invention.

FIG. 4C is a block diagram showing a voice identification module according to an embodiment of the invention. Referring to FIG. 4C, the voice identification module 130B includes a storage device 42, an audio embedding extraction unit 41 and an embedding match calculation unit 43. The audio embedding extraction unit 41 includes a neural network 410 and an average block 415. The neural network 410 is implemented by a DNN or a long short term memory (LSTM) network. The storage device 42 includes all forms of non-volatile or volatile media and memory devices, such as semiconductor memory devices, magnetic disks, DRAM, or SRAM.

For purpose of clarity and ease of description, hereinafter, the following examples and embodiments will be described with the neural network 410 implemented by a DNN. The DNN may be implemented using any known architectures. For example, referring to the disclosure "End-to-End Text-Dependent Speaker Verification", disclosed by Heigold et al, 2016 IEEE International Conference on Acoustics, Speech and Signal Processing (ICASSP), the DNN 410 consists of successive application of several non-linear functions in order to transform the user utterance into a vector; as shown in FIG. 4O, the DNN 410 includes a locally-connected layer 412 and multiple fully connected layers 411. It should be noted that the architecture of the DNN 410 is provided by way of example, but not limitation of the invention. Ay other architecture is applicable to the DNN as long as it can transforms the user utterance Z[n] into a current feature vector CV. The identification protocol is divided into three stages: training, enrollment and evaluation. In the training stage, a suitable user representation is found from the training utterances. For example, the user representations are a summary of frame-level information, such as feature vectors. After the training stage is completed, the parameters of the DNN 410 are fixed. In the enrollment stage, a user provides multiple utterances, which is used to estimate a user model. Due to the fact that each utterance generates one feature vector, the feature vectors of the enrollment utterances are averaged by the average unit 415 to obtain a user vector UV representative of the user model. And then, the user vector UV is stored in the storage device 42 by the DNN 410. Please note that in the enrollment stage, the embedding match calculation unit 43 is disabled. In the evaluation stage, the average block 415 is disabled. The DNN 410 transforms the user utterance Z[n] into a current feature vector CV. The embedding match calculation unit 43 retrieves the user vector UV from the storage device 42 and performs cosine similarity between the user vector UV and the current feature vector CV to generate N matching scores $P_k$ for N frequency bins, where $0<=k<=(N-1)$. If each of the user vector UV and the current feature vector CV has a dimension of N×N1, then the output vector P from the embedding match calculation unit 43 has a dimension of N×1. If N=256 and N1=2048, after performing cosine similarity, the embedding match calculation unit 43 generates an output vector P with 256×1 components $P_k$, $0<=k<=255$. As well known in the art, cosine similarity is a measure of similarity between two vectors of an inner product space; it is measured by the cosine of the angle between the two vectors and determines whether the two vectors are pointing in roughly the same direction. In this invention, cosine similarity is used to detect how similar the user vector UV and the current feature vector CV are in the frequency bin k, where, $0<=<=N-1$. The more similar (i.e., $P_k$ gets close to 1) the two vectors UV and CV in the frequency bin k, the greater the user own voice component in the frequency bin k.

Figure 4D:
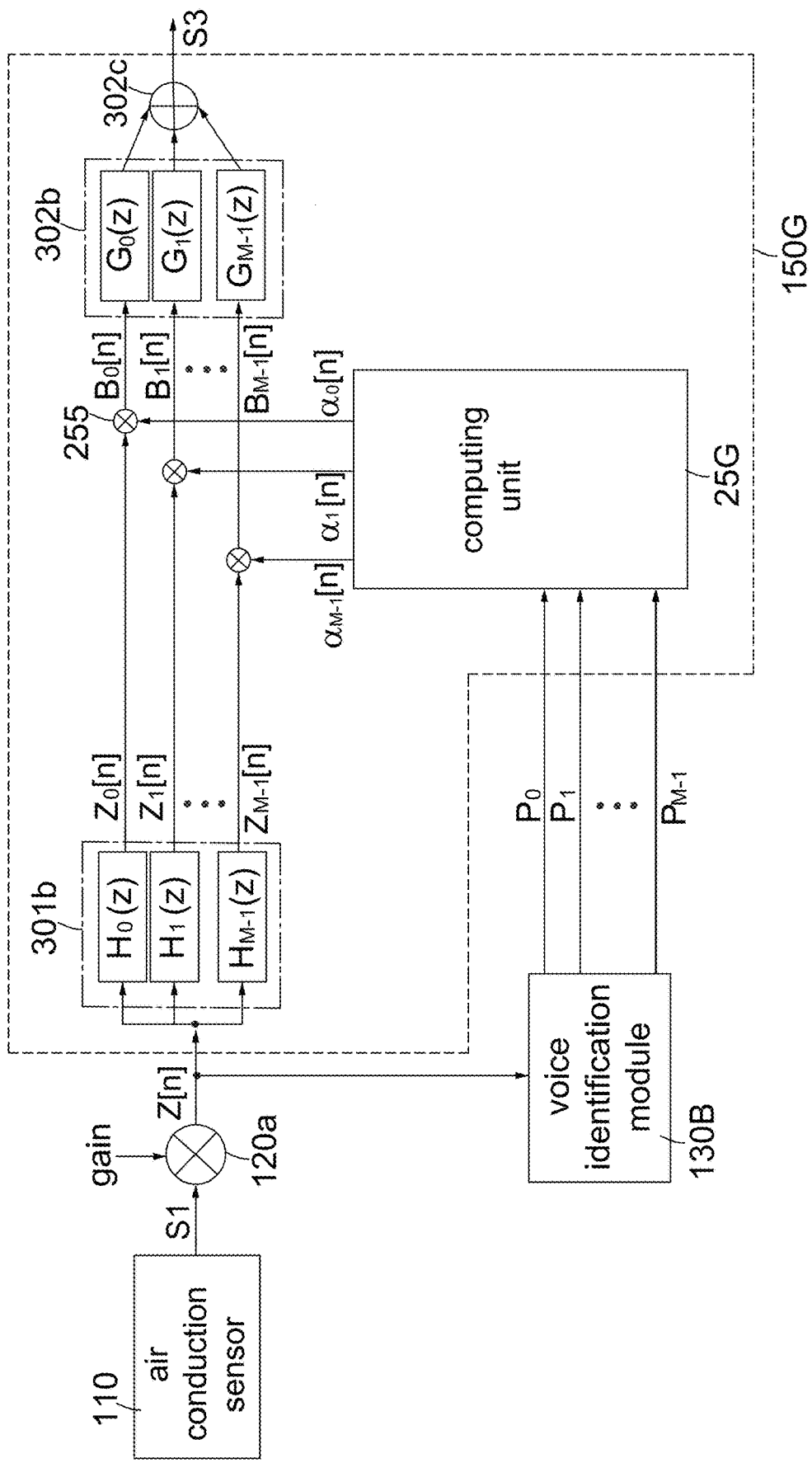
FIG. 4D is a block diagram showing an own voice suppression apparatus with a voice identification module according to another embodiment of the invention.

FIG. 4D is a block diagram showing an own voice suppression apparatus with a voice identification module according to another embodiment of the invention. In comparison with the own voice suppression apparatus 40A in FIG. 4B, a main difference is that the transformer 301a is replaced with an analysis filter bank 301b while the inverse transformer 302a is replaced with a synthesis filter bank 302b. The voice identification module 130B receives the amplified signal Z[n] to generate M matching scores $P_j$ corresponding to the M passbands of the analysis filter bank 301b, where $0<=j<=(M-1)$. Please note that, the frequency ranges of the M passbands of the M analysis filters for the analysis filter bank 301b respectively correspond to the frequency ranges of the M passbands with M matching scores $P_j$ from the voice identification module 130B. In an embodiment, the bandwidths of the M passbands of the M analysis filters are equal. In an alternative embodiment, the bandwidths of the M passbands of the M analysis filters are not equal; moreover, the higher the frequency, the wider the bandwidths of the passbands of the M analysis filters. Each matching score $P_j$ is bounded between 0 and 1. Thus, if any matching score $P_j$ gets close to 1, it indicates that the magnitude of the user's own voice component gets greater in the passband (or the speech sub-band signal $Z_j[n]$); otherwise, if any matching score $P_j$ gets close to 0, it indicates that the magnitude of the user's own voice component gets smaller in this passband j. According to the M matching scores $P_j$, the computing unit 25G calculates a suppression mask $\alpha_j[n]$ for each passband j (or each speech sub-band signal $Z_j[n]$) according to the following equation:

$$\alpha_j[n] = (1 - P_j), \tag{12}$$

where $0<=\alpha_j<=1$ and $0<=j<=(M-1)$.

Please note that the above equation (12) is provided by way of example, but not limitations of the invention. Any other type of equations is applicable to the computing unit 25G as long as it satisfies the inversely proportional relationship between $\alpha_j[n]$ and $P_j$. In brief, the greater the magnitude of $P_j$, the greater the magnitude of the user own voice component in the passband j (or the speech sub-band signal $Z_j[n]$) is and thus the less the suppression mask $\alpha_j[n]$ becomes for own voice suppression. In an alternative embodiment, similar to the three-phase process in FIG. 3E, the suppression mask $\alpha_j[n]$ for the speech sub-band signal $Z_j[n]$ is determined according to L matching scores of L speech sub-band signals with their passbands adjacent to the passband j of the speech sub-band signal $Z_j[n]$. For example, the computing unit 25G calculates L suppression masks of the L speech sub-band signals with their passbands adjacent to the passband j according to the L matching scores of the L speech sub-band signals, calculates an average value of the L suppression masks and then updates the suppression mask $\alpha_j[n]$ for the passband j (or the speech sub-band signal $Z_j[n]$) with the average value, where L>=1.

Figure 5A:
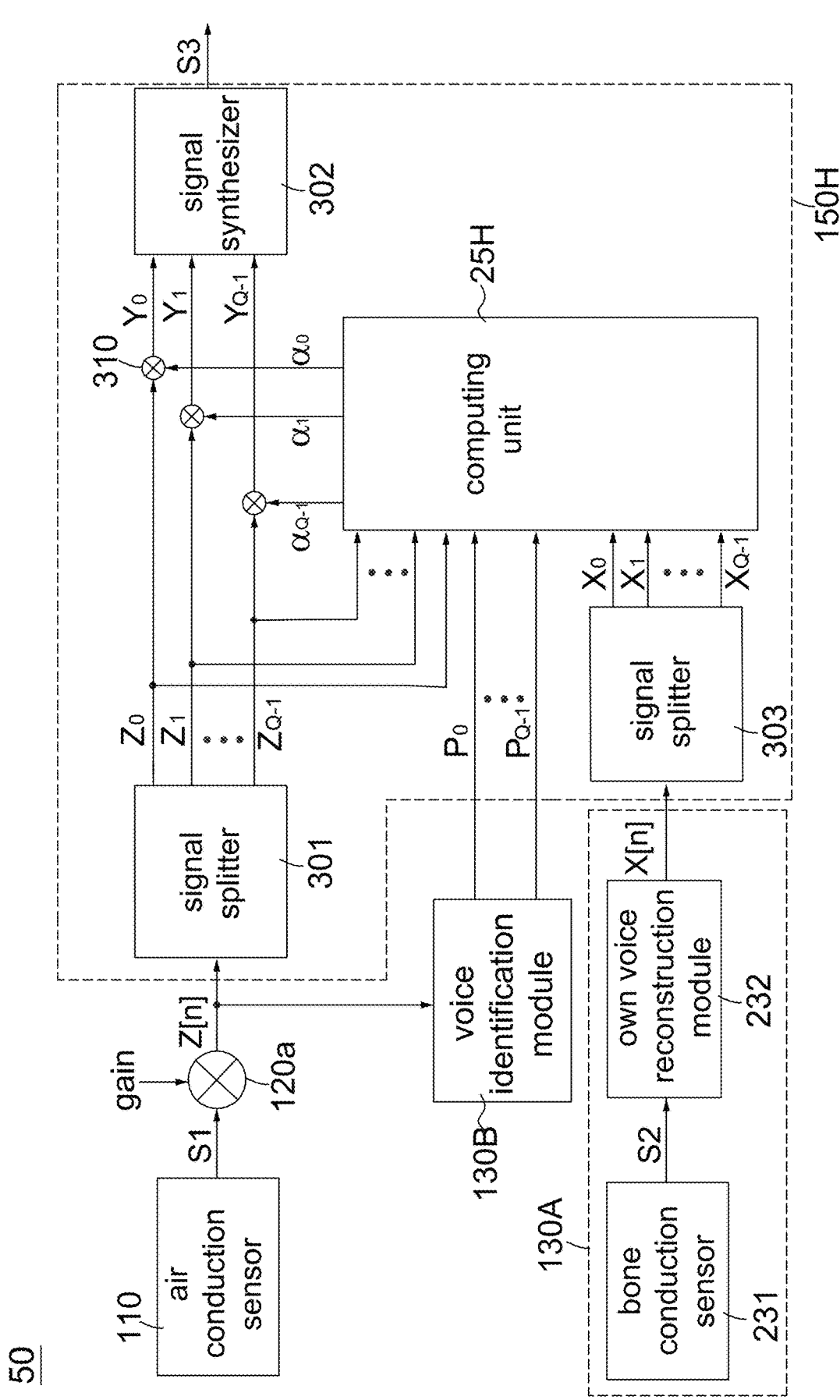
FIG. 5A is a block diagram showing an own voice suppression apparatus with a voice identification module and a bone conduction sensor according to an embodiment of the invention.

FIG. 5A is a block diagram showing an own voice suppression apparatus with a voice identification module and a bone conduction sensor according to an embodiment of the invention. Referring to FIG. 5A, the own voice suppression apparatus 50 includes the own voice suppression apparatus 30 and the voice identification module 130B. The computing unit 25H calculates Q suppression masks ($\alpha_0 \sim \alpha_{Q-1}$) according to the Q matching scores ($P_0 \sim P_{Q-1}$), the Q first signal components ($Z_0 \sim Z_{Q-1}$) and the Q second signal components ($X_0 \sim X_{Q-1}$).

Figure 5B:
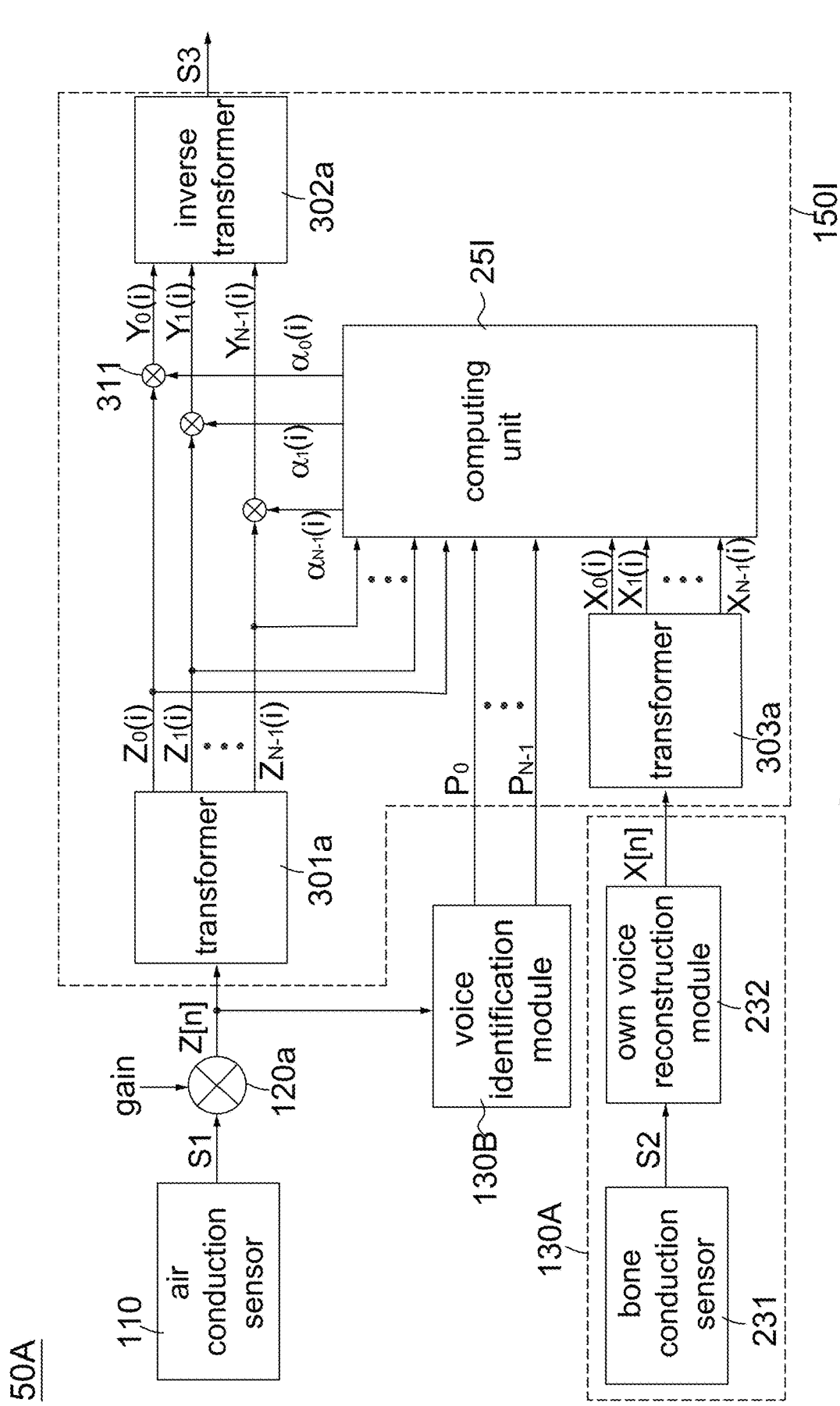
FIG. 5B is a block diagram showing an own voice suppression apparatus with a voice identification module and a bone conduction sensor according to another embodiment of the invention.

FIG. 5B is a block diagram showing an own voice suppression apparatus with a voice identification module and a bone conduction sensor according to another embodiment of the invention. Comparing to the own voice suppression apparatus 50 in FIG. 5A, the signal splitters 301/303 are implemented by transformers 301a/303a while the signal synthesizer 302 is implemented by an inverse transformer 302a.

Figure 5C:
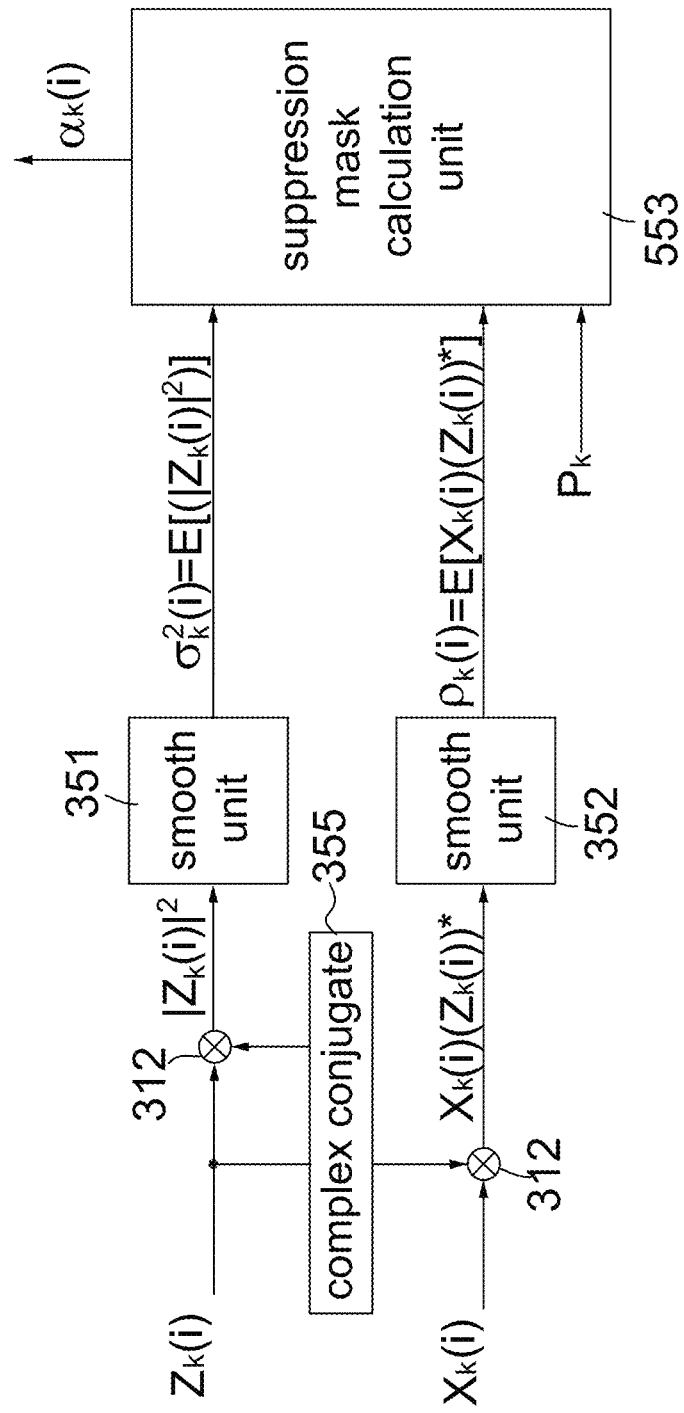
FIG. 5C is a block diagram showing the computing unit 25I according to an embodiment of the invention.

FIG. 5C is a block diagram showing the computing unit 25I according to an embodiment of the invention. Referring to FIG. 5C, the computing unit 25E includes two complex-value multipliers 312, a complex conjugate block 355, two smooth units 351 and 352 and a suppression mask calculation unit 553. According to the equation (7), the matching score $P_k$, the average speech power value $\sigma_k^2(i)$ and the average product complex value $\rho_k(i)$, the suppression mask calculation unit 553 calculates the suppression mask $\alpha_k(i)$ for a frequency bin k in the current speech spectral representation (associated with the current frame i of the amplified signal Z[n]) as follows:

$$\alpha_k(i) = \frac{(1-P_k)(\sigma_k^2(i) - \rho k(i))}{\sigma_k^2(i)} = \frac{(1-P_k)(E\{(|Z_k(i)|)^2\} - E[X_k(i)(Z_i(i))^*])}{E[(|Z_k(i)|)^2]}. \quad (13)$$

Please note that the above equation (13) is provided by way of example, but not limitations of the invention. Any other type of equations are applicable to the suppression mask calculation unit 553 as long as they satisfy the inversely proportional relationship between $X_k(i)$ and $\alpha_k(i)$, and the inversely proportional relationship between $P_k$ and $\alpha_k(i)$. In brief, the greater the magnitude of $X_k(i)$ and/or the magnitude of $P_k$, the greater the own voice component in the frequency band k of the current speech spectral representation is and thus the less the suppression mask $\alpha_k(i)$ becomes for own voice suppression. In an alternative embodiment, similar to the three-phase process in FIG. 3E, the suppression mask $\alpha_k(i)$ for a frequency bin k of the current speech spectral representation is determined according to L matching scores, L average speech power values and L average product complex values of L frequency bins adjacent to the frequency bin k. For example, the computing unit 25I calculates L suppression masks of the L frequency bins adjacent to the frequency bin k according to the L matching scores, L average speech power values and L average product complex values of the L frequency bins, calculates an average value of the L suppression masks and then updates the suppression mask $\alpha_k(i)$ for the frequency bin k with the average value, where L>=1.

Figure 5D:
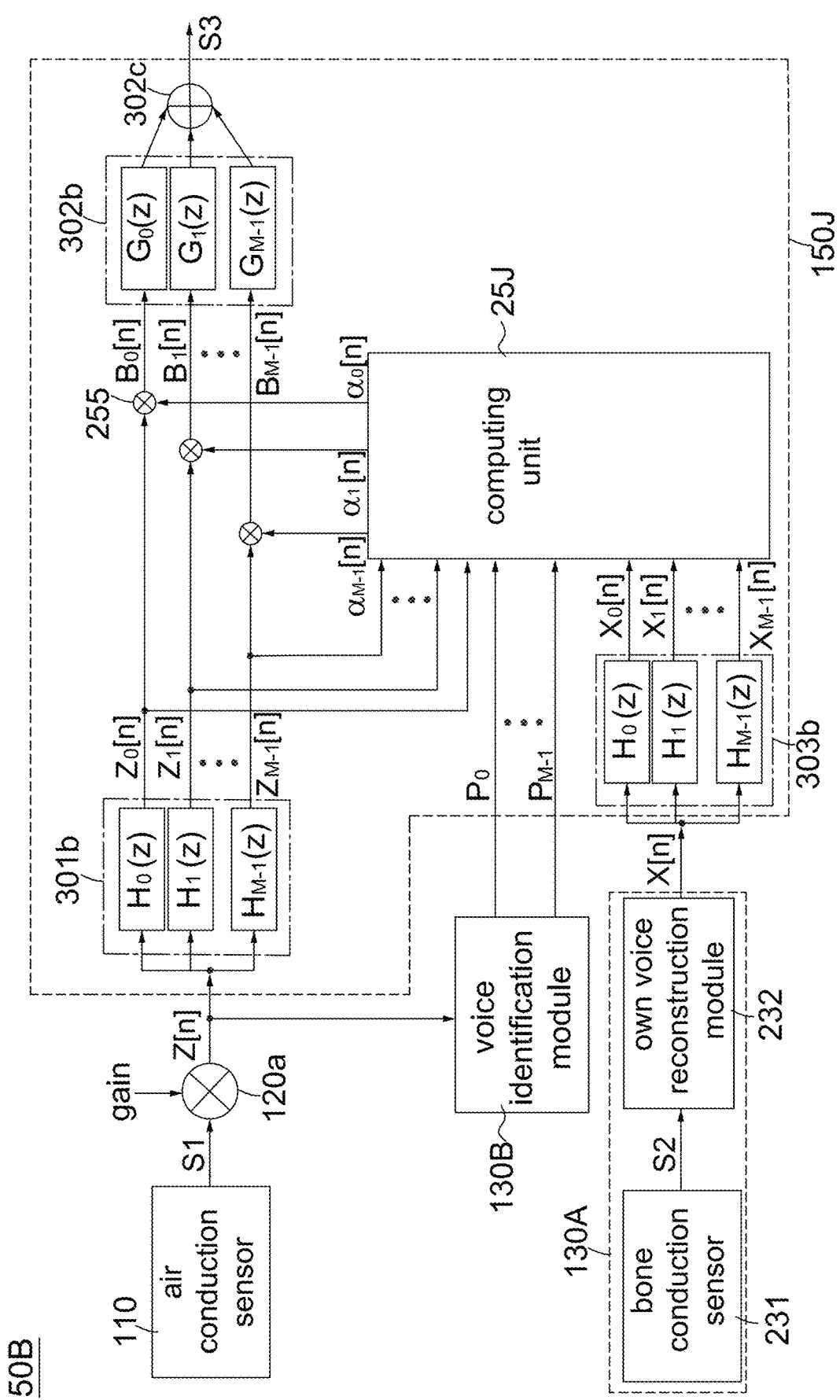
FIG. 5D is a block diagram showing an own voice suppression apparatus with a voice identification module and a bone conduction sensor according to another embodiment of the invention.
Figure 5E:
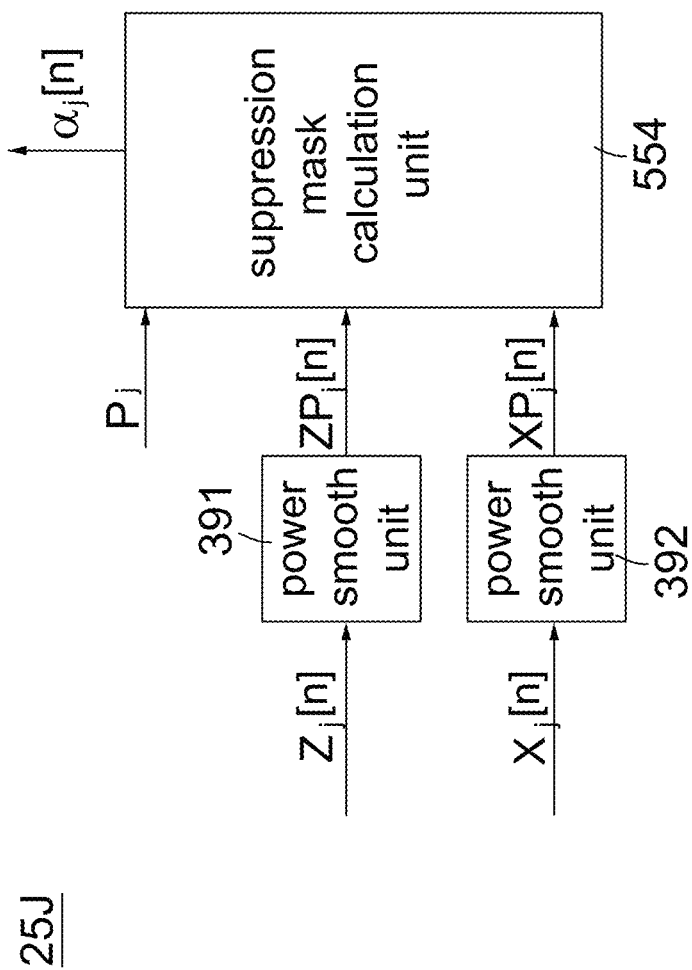
FIG. 5E is a block diagram showing the computing unit 25J according to an embodiment of the invention.

FIG. 5D is a block diagram showing an own voice suppression apparatus with a voice identification module and a bone conduction sensor according to another embodiment of the invention. Comparing to the own voice suppression apparatus 50 in FIG. 5A, the signal splitters 301/303 are implemented by the analysis filter banks 301b/303b while the signal synthesizer 302 is implemented by the synthesis filter bank 302b. FIG. 5E is a block diagram showing the computing unit 25J according to an embodiment of the invention. Referring to FIG. 5E, the computing unit 25J includes two power smooth units 391 and 392 and a suppression mask calculation unit 554. According to the equation (10), the matching score $P_j$, the average speech power value $ZP_j[n]$ and the average vibration power value $XP_j[n]$, the suppression mask calculation unit 554 calculates the suppression mask $\alpha_j[n]$ for the passband j (or the speech sub-band signal $Z_j[n]$) as follows:

$$a_j[n] = \frac{(1-P_j)(ZP_j[n] - XP_j[n])}{ZP_j[n]}, \quad (14)$$

where $0<=\alpha_j[n]<=1$, j is the passband index and $0<==(M-1)$.

Please note that the above equation (14) is provided by way of example, but not limitations of the invention. Any other type of equations are applicable to the suppression mask calculation unit 554 as long as they satisfy the inversely proportional relationship between $X_j[n]$ and $\alpha_j[n]$, and the inversely proportional relationship between $P_j$ and $\alpha_j[n]$. In brief, the greater the magnitude (or power value) of $X_j[n]$ and/or the magnitude of $P_j$, the greater the own voice component in the speech sub-band signal $Z_j[n]$ is and thus the less the suppression mask $\alpha_j[n]$ becomes for own voice suppression. In an alternative embodiment, similar to the three-phase process in FIG. 3E, the suppression mask $\alpha_j[n]$ for the speech sub-band signal $Z_j[n]$ is determined according to L matching scores and L average speech power values of L speech sub-band signals and L average vibration power values of L vibration sub-band signals, where the passbands of the L speech sub-band signals and the L vibration sub-band signals are adjacent to the passband j. For example, the computing unit 25J calculates L suppression masks of the L speech sub-band signals with their passbands adjacent to the passband j according to the L matching scores and the L average speech power values of the L speech sub-band signals and the L average vibration power values of the L vibration sub-band signals, computes an average value of the L suppression masks and then updates the suppression mask $\alpha_j[n]$ for the passband j (or the speech sub-band signal $Z_j[n]$) with the average value, where L>=1.

Obviously, the own voice suppression apparatus 50/50A/50B has the best performance of suppressing the user's own voice and retaining the environmental sounds due to the both assistance from the own voice indication module 130A and the voice identification module 130B. FIG. 6 show a relationship among waveforms of the audio signal S1, the vibration signal S2 and the own-voice-suppressed signal S3 according to an embodiment of the invention. Referring to FIG. 6, in the presence of the user's own voice, it is obvious that the magnitude of the audio signal S1 is abnormally large in comparison with the vibration signal S2, but the magnitude of the own-voice-suppressed signal S3 is significantly reduced after own voice suppression.

The own voice suppression apparatus 10/20/30/30A/30B/40/40A/40B/50/50A/50B according to the invention may be hardware, software, or a combination of hardware and software (or firmware). An example of a pure solution would be a field programmable gate array (FPGA) design or an application specific integrated circuit (ASIC) design. In an embodiment, the suppression module (150/150A~150J) and the amplification unit 120/120a are implemented with a first general-purpose processor and a first program memory; the own voice reconstruction module 232 is implemented with a second general-purpose processor and a second program memory. The first program memory stores a first processor-executable program and the second program memory stores a second processor-executable program. When the first processor-executable program is executed by the first general-purpose processor, the first general-purpose processor is configured to function as: the amplification unit 120/120a and the suppression module (150/150A~150J). When the second processor-executable program is executed by the second general-purpose processor, the second general-purpose processor is configured to function as: the own voice reconstruction module 232.

In an alternative embodiment, the amplification unit 120/120a, the own voice reconstruction module 232 and the suppression module (150/150A~150J) are implemented with a third general-purpose processor and a third program memory. The third program memory stores a third processor-executable program. When the third processor-executable program is executed by the third general-purpose processor, the third general-purpose processor is configured to function as: the amplification unit 120/120a, the own voice reconstruction module 232 and the suppression module (150/150A~150J).

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An own voice suppression apparatus applicable to a hearing aid, comprising:
   an air conduction sensor for generating an audio signal;
   an own voice indication module for generating an indication signal according to at least one of user's mouth vibration information and a similarity measure between the audio signal and prestored user's utterances; and
   a suppression module coupled to the air conduction sensor and the own voice indication module for suppressing the audio signal on an element-by-element basis to generate an own-voice-suppressed signal according to the indication signal, wherein the element is one of a sample, a frequency bin and a passband of the audio signal;
   wherein the own voice indication module comprises:
   a bone conduction sensor for measuring vibrations caused by user's mouth movements to output a vibration signal; and
   an own voice reconstruction module for reconstructing high-frequency components from the vibration signal to generate a reconstructed signal as a first indication signal;
   wherein the suppression module comprises:
   a first signal splitter coupled to the air conduction sensor for splitting the audio signal into Q first signal components;
   a second signal splitter coupled to the bone conduction sensor for splitting the reconstructed signal into Q second signal components;
   a second computing unit coupled to first signal splitter for generating Q second suppression masks for the Q first signal components; and
   Q multipliers coupled between first signal splitter and the second computing unit for respectively multiplying the Q second suppression masks by their corresponding first signal components to generate Q multiplied signals; and
   a first signal synthesizer coupled to the Q multipliers for reconstructing the own-voice-suppressed signal according to the Q multiplied signals, where Q>=1.

2. The apparatus according to claim 1, wherein the first and the second signal splitters are transformers, and the first signal synthesizer is an inverse transformer, wherein the Q first signal components are Q spectral values in Q frequency bins of a current audio spectral representation corresponding to a current frame of the audio signal and wherein the Q second signal components are Q spectral values in Q frequency bins of a current vibration spectral representation corresponding to a current frame of the reconstructed signal.

3. The apparatus according to claim 2, wherein the second computing unit comprises:
   a second suppression mask calculation unit for generating L second suppression masks for L frequency bins adjacent to a frequency bin k according to L average speech power values and L average product complex values for the L frequency bins related to the current audio spectral representation and the current vibration spectral representation and for computing an average of the L second suppression masks to generate a second suppression mask for the frequency bin k, where L>=1 and 0<=k<=(Q-1);
   wherein the second suppression mask for the frequency bin k and a complex value of the frequency bin k in the current vibration spectral representation are inversely proportional when L=1.

4. The apparatus according to claim 1, wherein the own voice indication module further comprises:
   a voice identification module for generating Q matching scores as a second indication signal for the Q first signal components according to the audio signal.

5. The apparatus according to claim 4, wherein the voice identification module comprises:
   an audio embedding extraction unit comprising:
   a neural network configured to transform a user utterance into a feature vector; and an average unit for computing an average of multiple feature vectors transformed from multiple user utterances during an enrollment stage to generate a user vector;
a storage device coupled to the average unit for storing the user vector; and
an embedding match calculation unit coupled to the neural network and the storage device for performing cosine similarity between the user vector from the storage device and the feature vector from the neural network to generate the Q matching scores corresponding to Q first signal components in an evaluation stage.

6. The apparatus according to claim 4, wherein the first and the second signal splitters are transformers, and the first signal synthesizer is an inverse transformer, wherein the Q first signal components are Q spectral values in Q frequency bins of a current audio spectral representation corresponding to a current frame of the audio signal and wherein the Q second signal components are Q spectral values in Q frequency bins of a current vibration spectral representation corresponding to a current frame of the indication signal.

7. The apparatus according to claim 6, wherein the second computing unit comprises:
a second suppression mask calculation unit for generating L second suppression masks for L frequency bins adjacent to a frequency bin k according to L matching scores for the L frequency bins, L average speech power values and L average complex values for the L frequency bins related to the current audio spectral representation and the current vibration spectral representation and for computing an average of the L second suppression masks to generate a second suppression mask for the frequency bin k, where $L>=1$ and $0<=k<=(Q-1)$;
wherein when $L=1$, the second suppression mask for the frequency bin k and a complex value of the frequency bin k in the current vibration spectral representation are inversely proportional, and the second suppression mask and a matching score for the frequency bin k are inversely proportional.

8. An own voice suppression apparatus applicable to a hearing aid, comprising:
an air conduction sensor for generating an audio signal;
an own voice indication module for generating an indication signal according to at least one of user's mouth vibration information and a similarity measure between the audio signal and prestored user's utterances; and
a suppression module coupled to the air conduction sensor and the own voice indication module for suppressing the audio signal on an element-by-element basis to generate an own-voice-suppressed signal according to the indication signal, wherein the element is one of a sample, a frequency bin and a passband of the audio signal;
wherein the own voice indication module comprises:
a voice identification module for receiving the audio signal to generate Q matching scores for Q signal components as the indication signal, where $Q>=1$;
wherein the Q matching scores for Q signal components correspond to the similarity measure between the audio signal and the prestored user's utterances.

9. The apparatus according to claim 8, wherein the suppression module comprises:
a third signal splitter for splitting the audio signal into the Q third signal components;
a third computing unit coupled to the third signal splitter for generating Q third suppression masks for the Q third signal components; and
Q multipliers coupled to the third signal splitter and the third computing unit for respectively multiplying the Q third suppression masks by their corresponding third signal components to generate Q multiplied signals; and
a second signal synthesizer for reconstructing the own-voice-suppressed signal according to the Q multiplied signals.

10. The apparatus according to claim 9, wherein the third signal splitter is a transformer, and the second signal synthesizer is an inverse transformer, wherein the Q third signal components are Q spectral values in Q frequency bins of a current audio spectral representation corresponding to a current frame of the audio signal.

11. The apparatus according to claim 10, wherein the third computing unit comprises:
a third suppression mask calculation unit for generating L third suppression masks for L frequency bins adjacent to a frequency bin k according to L matching scores for the L frequency bins and for computing an average of the L suppression masks to generate a third suppression mask $\alpha$ for the frequency bin k, where $0<=\alpha<=1$, $L>=1$ and $0<=k<=(Q-1)$;
wherein when $L=1$, the third suppression mask and a matching score for the frequency bin k are inversely proportional.

12. The apparatus according to claim 8, wherein the voice identification module comprises:
an audio embedding extraction unit comprising:
a neural network for transforming a user utterance into a feature vector; and
an average unit for computing an average of multiple feature vectors during an enrollment stage to generate a user vector;
a storage device coupled to the average unit for storing the user vector; and
an embedding match calculation unit coupled to the neural network and the storage device for performing cosine similarity between the user vector from the storage device and the feature vector from the neural network to generate the Q matching scores corresponding to the Q third signal components in an evaluation stage.

13. An own voice suppression method applicable to a hearing aid, comprising:
providing an audio signal by an air conduction sensor;
generating an indication signal according to at least one of user's mouth vibration information and a similarity measure between the audio signal and prestored user's utterances; and
suppressing the audio signal on an element-by-element basis to generate an own-voice-suppressed signal according to the indication signal, wherein the element is one of a sample, a frequency bin and a passband of the audio signal;
wherein the step of generating the indication signal comprises:
measuring vibrations caused by user's mouth movements by a bone conduction sensor to generate a vibration signal; and
reconstructing high-frequency components from the vibration signal to generate a reconstructed signal as a first indication signal;

wherein the step of generating the own-voice-suppressed signal comprises:
splitting the audio signal by a first signal splitter into Q first signal components;
splitting the reconstructed signal by a second signal splitter into Q second signal components;
generating Q second suppression masks for the Q first signal components; and
respectively multiplying the Q second suppression masks by their corresponding first signal components to generate Q multiplied signals; and
reconstructing the own-voice-suppressed signal by a first signal synthesizer according to the Q multiplied signals, where $Q>=1$.

14. The method according to claim 7, wherein the first and the second signal splitter are transformers, and the first signal synthesizer is an inverse transformer, wherein the Q first signal components are Q spectral values in Q frequency bins of a current audio spectral representation corresponding to a current frame of the audio signal and wherein the Q second signal components are Q spectral values in Q frequency bins of a current vibration spectral representation corresponding to a current frame of the reconstructed signal.

15. The method according to claim 14, wherein the step of generating the Q second suppression masks comprises:
generating L second suppression masks for L frequency bins adjacent to a frequency bin k according to L average speech power values and L average product complex values for the L frequency bins related to the current audio spectral representation and the current vibration spectral representation; and
computing an average of the L second suppression masks to generate a second suppression mask for the frequency bin k, where $L>=1$ and $0<=k<=(Q-1)$;
wherein the second suppression mask for the frequency bin k and a complex value of the frequency bin k in the current vibration spectral representation are inversely proportional when $L=1$.

16. The method according to claim 13, further comprising:
generating Q matching scores for the Q first signal components as a second indication signal according to the audio signal.

17. The method according to claim 16, wherein the step of generating the Q matching scores comprises:
transforming multiple user utterances into multiple feature vectors using a neural network in an enrollment stage;
computing an average of the multiple feature vectors to generate a user vector in an enrollment stage;
transforming a user utterance into a feature vector using the neural network in an evaluation stage; and
performing cosine similarity between a user vector and the feature vector to generate the Q matching scores corresponding to Q first signal components in the evaluation stage.

18. The method according to claim 16, wherein the first and the second signal splitter are transformers, and the first signal synthesizer is an inverse transformer, wherein the Q first signal components are Q spectral values in Q frequency bins of a current audio spectral representation corresponding to a current frame of the audio signal and wherein the Q second signal components are Q spectral values in Q frequency bins of a current vibration spectral representation corresponding to the current frame of the indication signal.

19. The method according to claim 18, wherein the step of generating Q second suppression masks comprises:
generating L second suppression masks for L frequency bins adjacent to a frequency bin k according to L matching scores for the L frequency bins, L average speech power values and L average complex values for the L frequency bins related to the current audio spectral representation and the current vibration spectral representation; and
computing an average of the L second suppression masks to generate a second suppression mask for the frequency bin k, where $L>=1$ and $0<=k<=(Q-1)$;
wherein when $L=1$, the second suppression mask for the frequency bin k and a complex value of the frequency bin k in the current vibration spectral representation are inversely proportional, and the second suppression mask and a matching score for the frequency bin k are inversely proportional.

20. An own voice suppression method applicable to a hearing aid, comprising:
providing an audio signal by an air conduction sensor;
generating an indication signal according to at least one of user's mouth vibration information and a similarity measure between the audio signal and prestored user's utterances;
suppressing the audio signal on an element-by-element basis to generate an own-voice-suppressed signal according to the indication signal, wherein the element is one of a sample, a frequency bin and a passband of the audio signal; and
generating Q matching scores for Q third signal components as the indication signal according to the audio signal, where $Q>=1$;
wherein the Q matching scores for Q signal components correspond to the similarity measure between the audio signal and the prestored user's utterances.

21. The method according to claim 20, wherein the step of generating the own-voice-suppressed signal comprises:
splitting the audio signal by a third signal splitter into the Q third signal components;
generating Q third suppression masks for the Q third signal components; and
respectively multiplying the Q third suppression masks by their corresponding third signal components to generate Q multiplied signals; and
reconstructing the own-voice-suppressed signal by a second signal synthesizer according to the Q multiplied signals.

22. The method according to claim 21, wherein the third signal splitter is a transformer, and the second signal synthesizer is an inverse transformer, wherein the Q third signal components are Q spectral values in Q frequency bins of a current audio spectral representation corresponding to a current frame of the audio signal.

23. The method according to claim 22, wherein the step of generating the Q third suppression masks comprises:
generating L third suppression masks for L frequency bins adjacent to a frequency bin k according to L matching scores for the L frequency bins; and
computing an average of the L third suppression masks to generate a third suppression mask a for the frequency bin k, where $0<=\alpha<=1$, $L>=1$ and $0<=k<=(Q-1)$;
wherein when $L=1$, the third suppression mask and a matching score for the frequency bin k are inversely proportional.

24. The method according to claim 20, wherein the step of generating the Q matching scores comprises:

transforming multiple user utterances into multiple feature vectors using a neural network in an enrollment stage;
computing an average of the multiple feature vectors to generate a user vector in an enrollment stage;
transforming a user utterance into a feature vector using the neural network in the evaluation stage; and
performing cosine similarity between the user vector and the feature vector to generate the Q matching scores corresponding to the Q third signal components in the evaluation stage.

* * * * *